(12) United States Patent
Riha et al.

(10) Patent No.: US 7,556,284 B2
(45) Date of Patent: Jul. 7, 2009

(54) PRE-WEAKENING OF FABRIC COVERED AIRBAG DOORS

(76) Inventors: Keith A. Riha, 4205 Oak Tree Cir., Rochester, MI (US) 48306; Ulrich Weissert, 3707 Briarbrook La., Rochester, MI (US) 48306; A. Hardy Sullivan, Jr., 1706 E. Bromfield Dr., Hillsborough, NC (US) 27278; Bruce Batchelder, 14 Piscataqua Rd., Dover, NH (US) 03820; John D Gray, P.O. Box 279, 17 Bridge St., Union, NH (US) 03887; Brian Totten, 5027 Oakdale Rd., Wilson, NC (US) 27893

( * ) Notice: Subject to any disclaimer, the term of this patent is extended or adjusted under 35 U.S.C. 154(b) by 0 days.

(21) Appl. No.: 11/465,711

(22) Filed: Aug. 18, 2006

(65) Prior Publication Data

US 2007/0040360 A1    Feb. 22, 2007

Related U.S. Application Data

(63) Continuation of application No. 10/373,332, filed on Feb. 24, 2003, now Pat. No. 7,100,941.

(51) Int. Cl.
*B60R 21/196* (2006.01)
(52) U.S. Cl. ..................... 280/728.3; 280/732
(58) Field of Classification Search ................. 280/732, 280/728.3
See application file for complete search history.

(56) References Cited

U.S. PATENT DOCUMENTS

| 4,753,088 A | 6/1988 | Harrison et al. |
| 5,110,666 A | 5/1992 | Menzel et al. |
| 5,131,678 A | 7/1992 | Gardner et al. |
| 5,385,784 A | 1/1995 | Sasaki et al. |

(Continued)

FOREIGN PATENT DOCUMENTS

DE    3315535 A1    3/1984

(Continued)

OTHER PUBLICATIONS

International Application No. PCT/US04/05440. Notification of Transmittal of the International Search Report and Written Opinion. Dated Aug. 15, 2005.

(Continued)

*Primary Examiner*—Ruth Ilan
(74) *Attorney, Agent, or Firm*—Grossman, Tucker, Perreault & Pfleger, PLLC

(57) ABSTRACT

A variety of embodiments are disclosed, in both apparatus and method form, that relate to the use of fabric material in the manufacture of an air bag deployment system. In addition, fabric weakening is disclosed according to a technique that does not result in physical alteration of the fabric. This invention therefore includes an air bag cover for an air bag safety system for a vehicle comprising a fabric outer layer having a frontside and a backside and a substrate containing an opening wherein the opening has a periphery. The substrate is preferably formed by low pressure molding, wherein the fabric outer layer overlies the opening in the substrate, and wherein the fabric outer layer is weakened at a location that is adjacent or overlies the substrate opening periphery.

7 Claims, 13 Drawing Sheets

U.S. PATENT DOCUMENTS

| | | |
|---|---|---|
| 5,421,608 A | 6/1995 | Parker et al. |
| 5,431,435 A | 7/1995 | Wilson |
| 5,487,558 A | 1/1996 | Ball et al. |
| 5,531,470 A | 7/1996 | Townsend |
| 5,540,459 A | 7/1996 | Daniel |
| 5,544,912 A | 8/1996 | Sommer |
| 5,564,731 A | 10/1996 | Gallagher et al. |
| 5,641,177 A | 6/1997 | Berg et al. |
| 5,685,930 A | 11/1997 | Gallagher et al. |
| 5,720,323 A | 2/1998 | Tremer |
| 5,744,776 A | 4/1998 | Bauer |
| 5,779,262 A | 7/1998 | Totani et al. |
| 5,783,016 A | 7/1998 | Gallagher et al. |
| 5,804,121 A | 9/1998 | Gallagher |
| 5,902,428 A | 5/1999 | Gallagher et al. |
| 5,941,558 A | 8/1999 | Labrie et al. |
| 5,961,143 A | 10/1999 | Hlywka et al. |
| 5,975,563 A | 11/1999 | Gallagher et al. |
| 5,992,877 A | 11/1999 | Gray |
| 6,042,139 A | 3/2000 | Knox |
| 6,050,595 A | 4/2000 | Knox |
| 6,059,311 A | 5/2000 | Wipasuramonton et al. |
| 6,062,590 A | 5/2000 | Gallagher |
| 6,076,564 A | 6/2000 | Bruggemann et al. |
| 6,102,435 A | 8/2000 | Wallner et al. |
| 6,107,218 A | 8/2000 | Rice |
| 6,131,945 A | 10/2000 | Labrie et al. |
| 6,139,049 A | 10/2000 | Gallagher |
| 6,140,602 A | 10/2000 | Costin |
| 6,145,879 A | 11/2000 | Lowe et al. |
| 6,152,482 A | 11/2000 | Patel et al. |
| 6,203,056 B1 | 3/2001 | Labrie et al. |
| 6,252,196 B1 | 6/2001 | Costin et al. |
| 6,254,122 B1 | 7/2001 | Wu et al. |
| 6,267,918 B1 | 7/2001 | Bauer |
| 6,283,001 B1 | 9/2001 | Schultes |
| 6,294,124 B1 | 9/2001 | Bauer et al. |
| 6,318,752 B1 | 11/2001 | Warnecke et al. |
| 6,328,367 B1 | 12/2001 | Eichhorn et al. |
| 6,337,461 B1 | 1/2002 | Yasuda et al. |
| RE37,540 E | 2/2002 | Iannazzi et al. |
| 6,402,189 B1 | 6/2002 | Gray et al. |
| 6,447,706 B1 | 9/2002 | Savonuzzi |
| 6,453,535 B1 | 9/2002 | Nicholas |
| 6,457,738 B1 | 10/2002 | Labrie et al. |
| 6,460,880 B1 | 10/2002 | Gallagher et al. |
| 6,475,423 B1 | 11/2002 | Masterson et al. |
| 6,719,320 B2 | 4/2004 | Gray et al. |
| 7,100,941 B2 | 9/2006 | Riha et al. |

FOREIGN PATENT DOCUMENTS

| | | |
|---|---|---|
| DE | 10001387 A1 | 7/2001 |
| EP | 0639481 A1 | 2/1995 |
| EP | 0715992 B1 | 6/1996 |
| EP | 1216894 A1 | 6/2002 |
| JP | 11034782 | 2/1999 |
| WO | 97/03866 | 2/1997 |
| WO | 98/10962 | 3/1998 |
| WO | 99/42336 | 8/1999 |
| WO | 2004/076233 A3 | 9/2004 |

OTHER PUBLICATIONS

European Application No. 04714168.4-2421. Patent No. PCT/US2004/005440. Supplementary European Search Report. Dated Jul. 3, 2006.

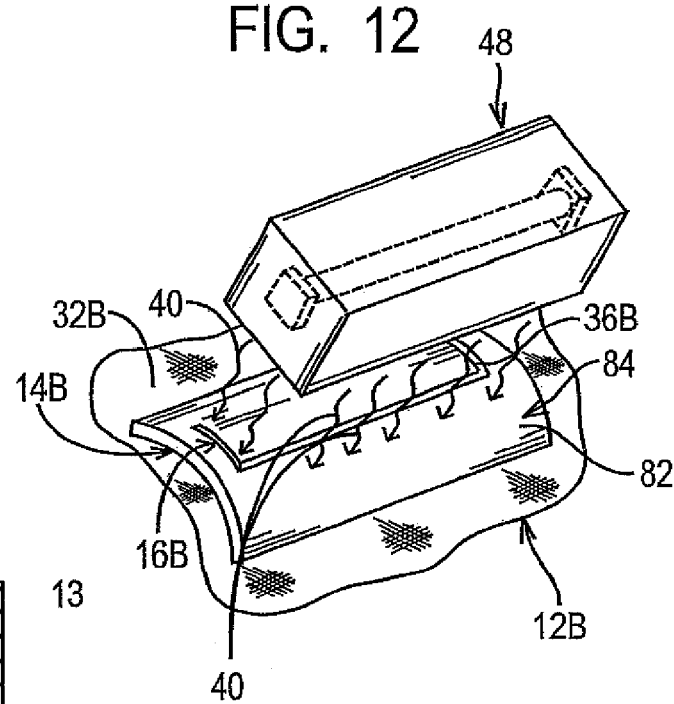
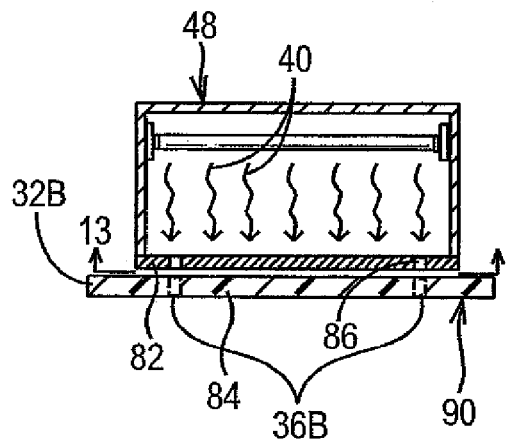
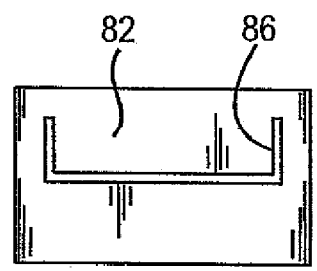

PRE-WEAKENING OF FABRIC COVERED AIRBAG DOORS

CROSS REFERENCE TO RELATED APPLICATIONS

This application is a continuation of U.S. application Ser. No. 10/373,332, filed Feb. 24, 2003 now U.S. Pat. No. 7,100,941 and published Aug. 26, 2004 as United States Patent Application Publication No. US 2004/0164531, the teachings of which are incorporated herein by reference.

FIELD OF INVENTION

This invention relates to air bag doors used in motor vehicles to conceal inflatable restraint systems and, more particularly, to air bag doors having fabric or textile as the top or outer surface which may be pre-weakened to allow deployment of the air bag.

BACKGROUND OF THE INVENTION

Air bag systems, or supplemental inflatable restraint systems, are commonplace in nearly all of the motor vehicles of today to protect occupants from serious injury upon collision or roll-over of their vehicles. With the present consumer interest quite high for additional features in new vehicles, air bag systems have proliferated inside the car such that they may deploy in nearly any direction and from nearly any surface. While air bag systems were originally integrated into the hub of the steering column for forward impact protection of the driver and into the instrument panel for similar protection for the front seat passengers, they may now be found integrated into seats and door panels for side protection, and integrated into headliners, pillar trim and quarter panels for roll-over protection. Additional locations may include air bags for knee protection by deploying from below the instrument panel, or air bags built into the back of the front seats to protect rear seated passengers, and even air bags integrated into the shoulder belts which are used for primary occupant protection.

For example, U.S. Pat. No. 6,102,435 to TRW Vehicle Safety Systems, Inc., entitled "Vehicle Headliner with Inflatable Side Curtain" is directed at a headliner assembly including an inflatable vehicle occupant protection device which is supported behind a door which hinges open upon bag inflation. U.S. Pat. No. 5,540,459 to Ford Motor Company, entitled "Roof Rail Mounted Air Bag Assembly" is directed at an inflatable restraint device having a trim cover which deflects away at its lower edge when an air bag opens downward from the roof side rail and between the occupant seat, the door and the window of the vehicle. U.S. Pat. No. 6,152,482 to Ford Global Technologies, Inc., entitled "Vehicle Inflatable Restraint System Trim with Trim Deploying Module" is directed at an inflatable restraint module mounted longitudinally adjacent a roof rail which when activated causes a flap member to operatively force a headliner assembly over a pillar trim piece to route the inflatable restraint past the pillar trim. U.S. Pat. No. 6,059,311 to Breed Automotive Technologies, entitled "Pillar-Mounted Side Impact and Rollover Air Bag" is directed at a side impact and crash protection and roll-over system comprising a web guide attachable to a pillar of a vehicle, a seatbelt system and an air bag assembly stored adjacent the web guide which when inflated is positioned adjacent the pillar. U.S. Pat. No. 5,531,470 to Joalto Design Inc., entitled "Side Air Bag Incorporated in Vehicle Outer Armrest" is directed at a vehicle side impact air bag system wherein the air bag is located in an outboard armrest which is pivotably attached to a vehicle seat. Upon deployment, a cover panel located over the armrest hinges along its bottom edge to allow the air bag to upwardly expand without restriction. These air bag systems all include some sort of cover which is integrated into the surrounding vehicle trim to prevent tampering with the air bag or the mechanism that causes the air bag to deploy and which further hinges or deflects to allow proper bag deployment. These covers generally comprise an outer cover skin and a rigid door substrate, sometimes separated by a foam layer.

As these safety devices have become accepted and more popular, it has become common to conceal the presence of the air bag and its inflating apparatus by providing a cover which is indistinguishable from the surrounding plastic trim (commonly known as the invisible or hidden air bag door). Thus, the aesthetics of the interior are enhanced and the reminder of the presence of the safety equipment is minimized.

As the locations for the air bag systems have proliferated, the need for different types of materials to cover the air bag systems and economically integrate into the surrounding interior trim package has been recognized. Generally, in cars, the materials used above the "belt line" are desirably softer in surface hardness while below the "belt line" where scuffing is more prevalent, hard injection molded plastics may be more preferentially employed Originally, air bag cover outer skins were of a soft thermoplastic (polyvinyl chloride, thermoplastic olefin or elastomer, thermoplastic urethane, etc.). Since seats, headliners, door panels and pillars are often fabric covered, particularly in European cars, there has been a recent focus on developing fabric or textile materials as candidates for the outer surface of air bag covers which might meet the demanding aesthetic and functional requirements.

One construction of a fabric covered air bag door that employs a "peel back" method is disclosed in. U.S. Pat. No. 6,050,595 commonly assigned to the assignee of the present invention. The '595 patent is directed at an air bag closure assembly comprising a trim member including a panel and a skin, wherein the skin is supported on the outer surface of the door and trim member panel and whereupon air bag inflation the front edge of the door is pivoted away from the opening around the hinge to provide a path for air bag deployment through the panel. The skin is at least partially separable from at least a portion of the panel outer surface that extends laterally outward from the side edges of the door and from the front edge of the door to a front edge of the skin adjacent the front edge of the door, the skin delaminating when the door carries the skin outwardly and lifts the skin from the panel outer surface as the air bag inflates and forces the door to an open position, the skin forming a skin tent over the door, the skin tent having a skin tent opening formed by the delaminated front edge of the skin thus providing an exit for the deploying air bag.

To provide deployment of the airbag without fragmentation of the cover and to ensure tearing of the cover skin and reliable opening of the air bag door in combination with concealment of the door and door opening, it has been found that pre-weakening of the cover skin in a pattern that approximates the air bag door opening is desired. This pre-weakening is has been accomplished by reducing the cross-section (i.e. thickness) of the cover skin and door substrate locally to form a tear seam. This may be accomplished by molding a groove into the door substrate and into the inside of the cover skin or by the use of a laser or knife to form a groove (slots, perforations, etc.) in the substrate layer which may extend into a foam and/or cover layer.

For example, European Patent Application EP 1216894A1 to Delphi Automotive, entitled "Instrument Panel with Integral Hidden Door Cover and Method of In-Process Manufacture Thereof" is directed at forming a score on the backside of a preferably vacuum formed instrument panel skin with a cylinder-activated blade to create a weakened region in the pattern of an air bag door seam. The skin is then foamed in place with a retainer. U.S. Pat. Nos. 5,421,608; 5,431,435; 5,447,328/RE 37,540; 5,564,731; 5,685,930; 5,783,016; 5,804,121; 5,902,428; 5,941,558; 5,961,143; 5,975,563; 6,050,595; 6,131,945; 6,203,056; 6,402,189; 6,457,738; 6,460,880; and U.S. application Ser. Nos. 10/286,251; 60/367,924; 60/368,418; and 60/411,548; commonly assigned to the assignee of the present invention and included herein by reference, are directed at air bag doors which are contained in or molded as part of a larger panel and which contain weakened areas to allow predictable deployment of an air bag through the panel.

While examples of this technology are common with the flexible skin materials, it has not been fully demonstrated that weakening of a fabric layer for a cover can be similarly accomplished. Use of a laser beam to cut fabric is known. U.S. Pat. No. 6,283,001 B1, entitled "Facility for Cutting Fabric . . . " recites "in a preferred embodiment, the cutting head is a laser cutting beam. This type of cutting head possesses a laser beam source and a corresponding focusing optical system, which focuses the laser beam on the fabric band. To avoid undesirable oxidation, an additional protective gas jet can be provided, which pushes away from the cutting position the oxygen containing air by means of inert gases, i.e.: nitrogen or other inactive gases. Especially, where artificial fiber containing textiles are concerned, a fume removal system can be provided, which, during the cutting, removes the vaporized substance in order to uphold the required working place environmental regulations (MAK-values). Attention is also directed to U.S. Pat. No. 6,140,602, entitled "Marking of Fabrics and Other Materials Using A Laser" to Technolines LLC, which discloses a method for imparting laser induced patterns and other designs on thin fabrics and leathers.

Regarding specific references to weakening cover layers in air bag door systems, U.S. Pat. Nos. 6,294,124 B1 and 5,744,776 to Bauer of TIP Engineering suggest the use of a laser to weaken the backside of a "cover layer" by cutting through the substrate and partially through the cover layer. FIG. 13 therein is said to illustrate "the use of a laser applied to a cosmetic cover layer 92 shown as a textile material as might be used with a side impact air bag system, which has a scrim backing layer 94 bonded thereto. The laser scored groove 95 penetrates completely through the backing scrim 94 and partially through the textile layer 92." Published United States Application No. 20022/0050046A1 also to TIP Engineering, is entitled "Process for Manufacturing an Automotive Trim Piece Preweakened To Form An Air Bag Deployment Opening". This application recites a process for constructing a trim piece having a section pre-weakened in a pattern to allow formation of one or more deployment doors, whereby a stiff substrate is formed having one or more integral doors with a predetermined gap between adjacent portions and one or more cover layers are laid over the substrate panel and extend across the predetermined gaps. Pre-weakening of the overlaying cover layers is accomplished by laser scoring portions of the inside of the cover layers along the gap.

Therefore, while the field not surprisingly has many disclosures charting off in a variety of different directions to provide a cosmetically appealing and functional air bag deployment system, there still exists a need in the art for fabric or textile covered trim panels to be used as air bag covers, wherein the fabric as well as the substrate is efficiently pre-weakened to allow predictable deployment of the air bag and tearing of outer cover layer.

SUMMARY OF THE INVENTION

According to the present invention, an air bag cover for an air bag system in a motor vehicle is provided having a textile or fabric outer layer which has been pre-weakened in a pattern to allow a predictable deployment of the air bag. The air bag cover preferably comprises an outer textile or fabric layer, a backing layer and a plastic substrate, preferably formed by low pressure molding. The pre-weakening may be accomplished by reducing the cross-section of some or all of the layers of the air bag cover from at least one of the front and back side of the cover. Alternatively, the pre-weakening may be accomplished by weakening the fibers or yarn used in the outer layer by, e.g., laser, chemical treatment, or by photodegradation, or by melting or by actually weaving a pattern into the fabric, the pattern comprising weaker yarns which are strategically positioned to provide an area which is weaker than the remainder of the fabric and which preferentially tear upon air bag deployment. In addition, in the case of laser, e.g., the invention herein weakens the fabric without a physical alteration wherein, e.g., the thickness and/or appearance of the fabric remains substantially unchanged by a controlled laser exposure.

According to another aspect of the present invention, air bag covers having a fabric outer layer are provided that can be used anywhere in the interior of the vehicle to complement the appearance of the surrounding interior trim, including but not limited to, the instrument panel, steering wheel, console, door panels, seats, headliner, quarter panels, pillars and window trim.

According to another aspect of the present invention, a preferred construction for fabric covered air bag covers is provided which includes a fabric or textile layer, a backing layer and a low pressure-molded substrate.

According to another aspect of the present invention, a means for pre-weakening the fabric or textile outer layer of the air bag cover is provided by reducing the cross-sectional thickness of the outer layer locally with a laser or a knife blade from at least one of the front and back sides of the outer layer.

According to another aspect of the present invention, a means for pre-weakening the fabric or textile outer layer of the air bag cover is provided by weaving into the fabric outer layer a pattern corresponding to the shape of the air bag door opening, the pattern comprising yarn that is weakened to a lesser tensile strength than the remainder of the yarn used in that area.

According to another aspect of the present invention, the fabric outer layer of an air bag cover is weakened by treating the fabric locally from at least one of the front and back sides with a chemical, with a light source causing photodegradation, or with a laser.

According to another aspect of the present invention, an air bag cover for an air bag safety system for a vehicle is provided, comprising a fabric outer layer having a front side and a backside, and comprising a weakened portion and a non-weakened portion. A substrate containing an opening is provided, said opening having a periphery, the substrate preferably formed by low pressure molding. The fabric outer layer is made to overlie the opening in the substrate, and the non-weakened portion of said fabric layer is made to overlie a portion of said periphery and said weakened portion overlies another portion of said periphery.

According to yet another embodiment of the present invention, an air bag cover for an air bag safety system for a vehicle is provided, comprising a fabric outer layer having a front side and a backside, and comprising a reinforced portion and non-reinforced portion. A substrate containing an opening is provided, said opening having a periphery, the substrate preferably formed by low pressure molding. The fabric outer layer overlies the opening in the substrate, and the reinforced portion of said fabric layer overlies a portion of said periphery.

These and other objects, features and advantages of the present invention will be understood through consideration of the following detailed description in connection with the accompanying drawings.

BRIEF DESCRIPTION OF THE DRAWINGS

FIG. 12 is a diagrammatic view showing a third embodiment for preparing a tear seam according to the present invention.

FIG. 13 is a view taken along lines 13-13 of FIG. 14.

FIG. 14 is a diagrammatic view showing an alternate method of preparing a tear seam according to the third embodiment of the present invention.

DETAILED DESCRIPTION OF THE PREFERRED EMBODIMENTS OF THE INVENTION

Figure 1:
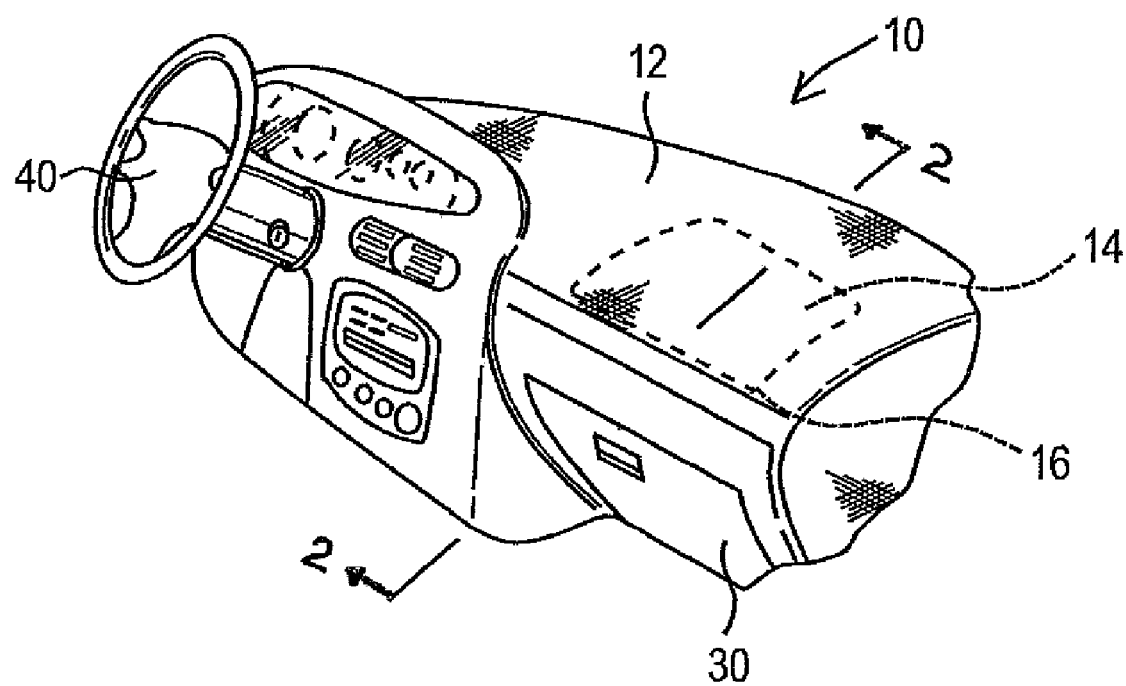
FIG. 1 is a perspective view of an air bag cover assembly constructed according to the present invention and integrated into a vehicle instrument panel.

In FIG. 1, a fabric covered automobile instrument panel assembly 10 is shown as would be installed below the windshield in the cockpit of a vehicle. An inflatable restraint assembly or air bag system (not shown) for protecting the occupants of the vehicle is located beneath an integrally formed air bag door 14, the door having a perimeter defined, in part, by a hidden marginal edge 16, shown by the dashed lines. The perimeter 16 may also be defined as the lateral boundary of the door 14, the door 14 being defined as that portion of the integrally formed panel 12 and door 14 that is separable or bendable from the panel 12 under the force of air bag inflation. The door 14 and vehicle instrument panel 12 may be integrally formed as a single unitary piece. Pre-weakening of the panel 12 to demarcate the air bag door 14, usually from the backside to preserve an uninterrupted Class A outer surface may take place along or adjacent the perimeter 16.

The automobile instrument panel assembly generally shown at 10 in FIG. 1, represents a first preferred embodiment of the present invention. FIG. 1 shows a fabric covered air bag door 14 integrated into the passenger side of a fabric covered automobile dashboard or instrument panel 12. Alternatively, the air bag cover may be integrated into the knee bolster area 30, steering wheel hub 40, or other areas in the interior of the vehicle including, but not limited to, seats, headliner, pillar trim, door panels, quarter panels, roof rails (all not shown) and the like.

Figure 2:
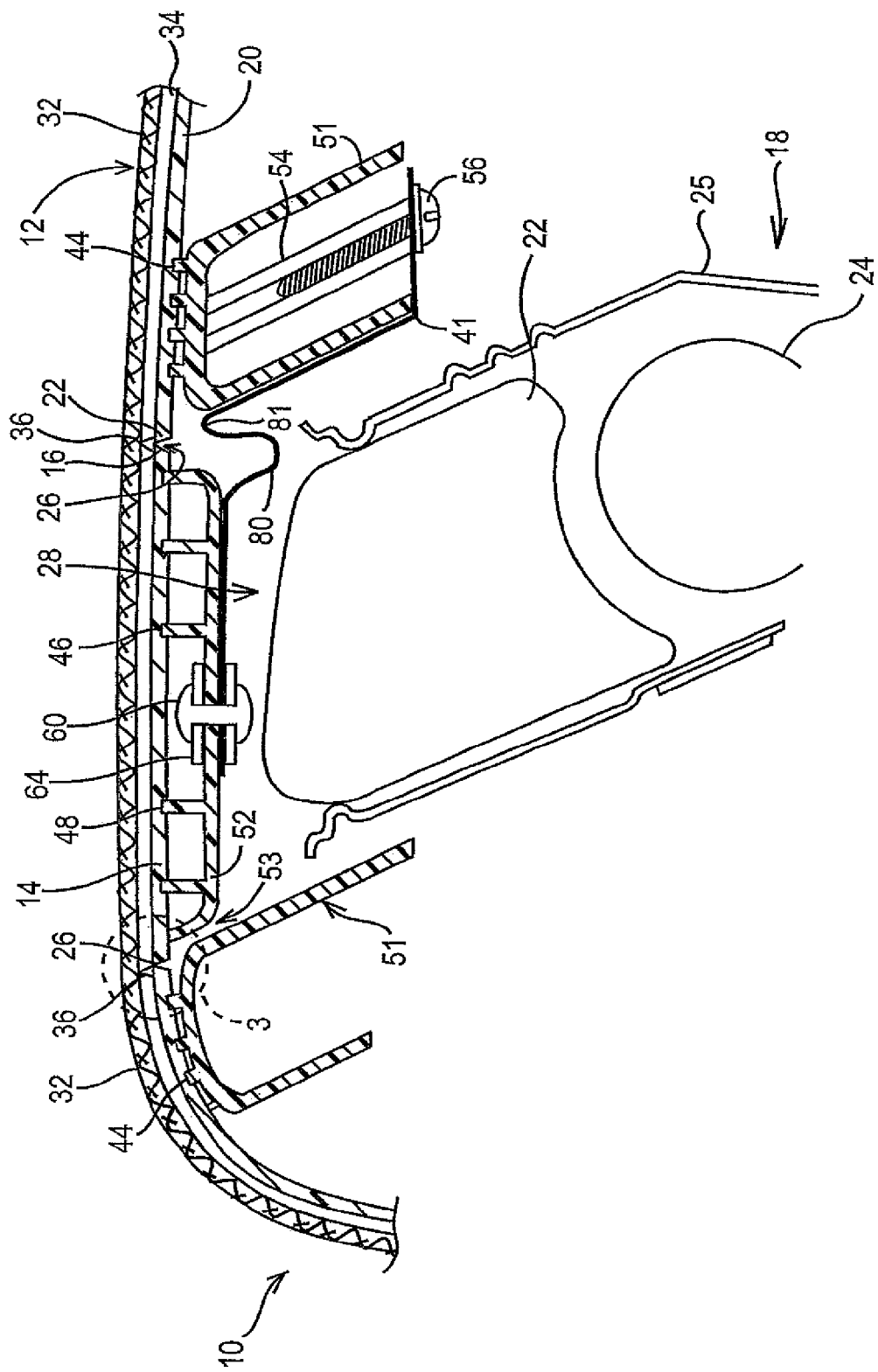
FIG. 2 is a cross-sectional side view of an air bag deployment assembly disposed behind the air bag cover assembly and instrument panel of FIG. 1 taken along lines 2-2.

The assembly 10 comprises a trim panel generally indicated at 12 in FIG. 2 and an integral air bag door, generally indicated at 14. The air bag door 14 may be molded as part of the trim panel 12 and is disposed in and closes a like-shaped air bag deployment opening 28 in the trim panel 12. The door 14 has an outer edge 16, which abuts and forms a frangible tear seam 26 with an inner edge 22 of the air bag deployment opening 28. The seam 26 formed in the substrate 20 may comprise an area of reduced cross-section created by molding the section thinner than the thickness of the surrounding substrate during the low pressure molding process that forms the panel 12 and door 14 and back-fills the outer surface layer 32. Alternatively, the seam 26 may be formed by routing, laser cutting or knife cutting into or through the substrate. The seam may be a continuous groove or intermittent slots or perforations formed partially through or completely through the substrate layer 20. The tear seam 26 is preferably invisible to the occupants of the vehicle for reasons of aesthetics, and thus is shown in FIG. 1 by dashed lines. Alternatively, the weakened area or tear seam 26 may be formed in the top Class A surface of the panel, or alternately in both the top and bottom surfaces of the molded panel. The panel 12 is generally molded of a somewhat ductile plastic and the frangible tear seam 26 of reduced cross-section is designed to fracture due to the pressure of the inflating air bag, allowing the air bag door 14 to break loose from the instrument panel 12 predictably and without fragmentation.

As shown in sectional view in FIG. 2, taken at line 2-2 of FIG. 1 looking in the direction of the arrows, a fabric covered instrument panel 12 covers an air bag system 18 that is located behind the instrument panel directly beneath the air bag door 14 and is mounted to a metal portion of the vehicle structure (not shown). The air bag system includes an inflatable folded air bag 22, an inflator 24, canister 25 and an impact sensor (not shown) that on vehicle impact triggers ignition of the inflator to inflate the air bag for deployment into the passenger space directly in front of a passenger seated on that side of the vehicle. As further shown in FIG. 2, a plastic deployment chute 51 is attached at 44, preferably via vibration welding, to the backside of the instrument panel substrate 20 just outboard of the frangible tear seam 26 in the area of the air bag door 14 to direct the air bag 22 and which creates sufficient structure in the panel to direct the force of the inflating bag into the pre-weakened tear seam 26 surrounding the air bag door 14. A reaction plate 52 which contains stiffening ribs 46 is similarly and preferably welded at 48 to the air bag door 14 backside to provide stiffness. The deployment chute and reaction plate are preferably molded of a plastic compatible with the instrument panel substrate 20 and are welded to the backside of the instrument panel substrate 20 and door 14 so that the tear seam 26 is located in line with the chute inner periphery 53. The reaction plate 52 is attached to the air bag door portion 14 of the molded hard instrument panel 12 such that on air bag deployment the welded air bag door/reaction plate combination separates from the instrument panel/deployment chute welded assembly. As the air bag 22 expands to fill the area inside the deployment chute 51, the bag contacts the reaction plate 52 and forces the welded reaction plate 52/air bag door 14 to fracture at the tear seam 26.

Various plastic materials may be molded to form both the instrument panel with integral air bag door and the deployment chute/reaction plate including, but not limited to, acrylonitrile-butadiene-styrene, polycarbonate, polyurethane, polyamide, styrene maleic anhydride, polypropylene, polyolefin, thermoplastic olefin, thermoplastic elastomer, polyphenylene oxide and combinations thereof.

As alluded to above, the attachment of the reaction plate and deployment chute is preferably by vibration welding of the molded chute/plate to the instrument panel but may also comprise other welding methods and attachment means including, but not limited to, hot plate welding, adhesive mechanical attachment, etc.

As shown in FIG. 2, a metal tether 41 which may contain a formed loop 80 is attached to the reaction plate 52 by a rivet 60 and washer 64 and to the deployment chute 51 by a fastener 56 screwed into a boss 54. The washer 64 may be an H-shaped piece of stock that fits between the ribs of the reaction plate. The metal tether 41 may be a steel stamping formed to shape and alternatively may comprise a series of holes or slots in the stamping in the area of the loop 80 to assist in hinging of the tether to control air bag door 14/reaction plate 52 travel. The formed loop 80 may comprise one or more loops disposed between the reaction plate 52 and the deployment chute 51 to create the desired amount of slack for the deploying door. In addition, the loop itself may be selectively positioned at the open space under the area of reduced cross-section 26 as shown at 81. Alternatively, the loop may be selectively positioned adjacent the fastener 56. Typically, the tether may be one or more metal stampings approximately 200 mm wide by 0.6 mm in thickness. Preferably, the tether may be the same width as the reaction plate to provide a predictable deployment result at high temperature and extend through a bent section 81 to be anchored at the deployment chute. Alternatively, the metal tether 41 may not include a loop 80 and may act as a hinge for the door 14.

The instrument panel 12 further comprises an outer layer of fabric 32 and may further include a backing layer 34. As will be shown in fragmentary cross-section in FIG. 3, the outer layer of fabric 32 and the backing layer 34 may be weakened in the area of the door seam 26 to provide predictable and reliable deployment of the air bag 22 through the opening 28 in the trim panel 12.

Figure 3:
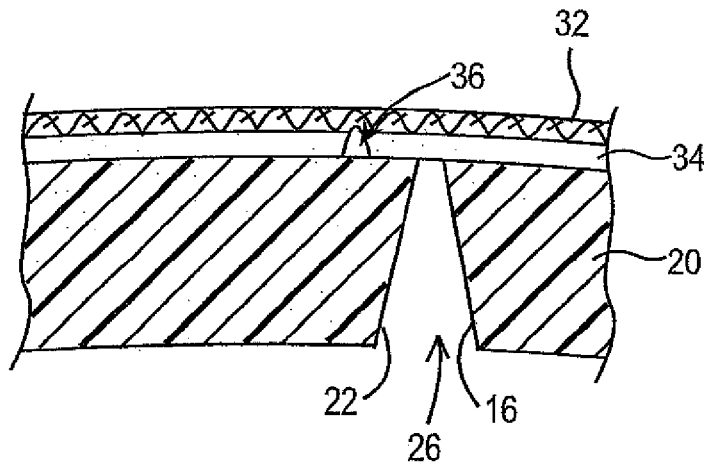
FIG. 3 is a magnified fragmentary cross-sectional view of an air bag cover assembly constructed according to the present invention.

Turning to FIG. 3, a preferred embodiment of the construction of the pre-weakened fabric covered air bag door and instrument panel assembly is shown. This enlarged fragmentary cross-sectional view is taken from FIG. 1 at the circle indicated by the numeral 3 showing the detail of the tear seam 26 in the substrate 20 and additional weakening of the cover layer 32 and backing layer 34. A tear seam 36 extends through the backing layer 34 and partially through the fabric layer 32 to provide predictable tearing of the cover layers 32, 34 during air bag deployment. The cover layer tear seam 36 is preferably located just outboard of the door/substrate tear seam 26 so that the mode of failure for the cover layers 32, 34 is in tensile rather than in shear, as this provides more consistent tearing. Alternatively, the cover layer tear seam 36 may be aligned over the door/substrate tear seam 26. (See FIG. 4.) Both tear seams 26, 36 may extend around the full periphery of the door 14 or may be interrupted. In addition, in terms of specific dimensions, the outboard cover layer tear seam 36 may be outboard of the door/substrate tear seam 26 by an amount equal to or greater than 1.0 mm, and can lie in the range of 1.0 mm to 50 mm, and at any 0.1 mm increment therebetween. Most preferred values are in the range of 5.0 mm to 15.0 mm.

Manufacture of the fabric covered instrument panel with integral air bag door and pre-weakened tear seams may be preferably accomplished as follows. A fabric material 32 is chosen which will withstand the rigors of the area in the vehicle in which it will be used (abrasion, heat, light exposure, feel, appearance, etc.). The fabric may include, but is not limited to, cloth, carpet, knit, tricot, chenille, natural or synthetic composition, woven or non-woven, in a thickness, weight and denier which meets the requirements for a trim material in the area of the interior of the vehicle that will house the air bag.

Flat fabrics are preferred in this invention, either knits or wovens. As used herein, the term "woven fabric" refers to a fabric containing a structure of fibers, filaments or yarns which are orderly arranged in an interengaged fashion. Woven fabrics typically contain interengaged yarns in a "warp" and "fill" direction. The warp direction corresponds to the length of the fabric while the fill direction corresponds to the width of the fabric. Suitable pile or effect yarns for use in the present invention include, but are not limited to, natural fibers such as cotton, linen, jute, hemp, cotton, wool, and wood pulp, regenerated cellulosic fibers such as viscose rayon and cuprammonium rayon, modified cellulosic fibers such as cellulose acetate, and synthetic fibers such as those derived from polypropylene, polyethylene, polyvinyl alcohol, polyesters, polyamides, and polyacrylics. The above-mentioned pile or effect yarns may be used alone or in combination with one another. Multicomponent fibers comprising a blend of one or more of the above materials may also be used if so desired. Preferably, the cover fabric comprises a polyester woven fabric having a weight of about 300-350 grams/square meter, although weights as low as 100 gr/m$^2$ have been used. Further, knits seem to perform equally well.

A backing material 34 may be optionally applied to the underside of the fabric to prevent strike-through by the subsequent substrate 20 when it is molded behind the backing layer. The backing material serves to reduce the porosity of the fabric layer and is preferably a non-woven layer of polyester or polypropylene with a weight of about 200-250 grams/square meter. The backing material may include, but is not limited to, a spun laced non-woven, a needle punched non-woven, felt, an adhesive layer, and a plastic backing layer such as EVOH, EVA, polyethylene, and polyester acrylic. The backing layer 34 may be attached to the underside of the fabric layer 32 by methods including, but not limited to, flamebonding, adhesive film, adhesive spray, etc. Alternatively, the fabric outer layer 32 and backing layer 34 may be separated by a foam layer to provide a softer touch for the trim panel and air bag cover.

The composite fabric layer 32/backing layer 34 is then preferably pre-weakened in a pattern roughly coinciding with the outline of the air bag door area 16. Pre-weakening may be accomplished by laser scoring, by sonic knife or by the application of a hot knife blade under pressure which melts through the backing 34 and partially through the fabric layer 32. This is done to provide an uninterrupted surface over the air bag door area and provide a hidden air bag door 14 in the panel 12. The pre-weakened tear seam 36 in the cover layers 32, 34 may comprise a continuous groove or may be a series of intermittent slots or holes which provide weakening.

Figure 7:
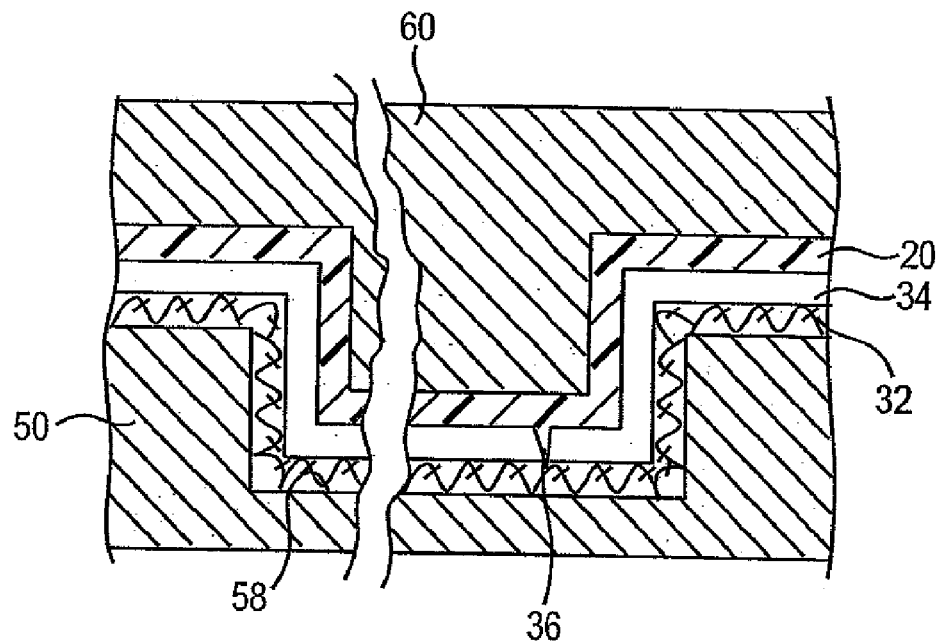
FIG. 7 is a cross-sectional view of a molding apparatus containing a low pressure molded trim panel with a fabric layer and backing layer bonded thereto.

In a process which is particularly suitable for use in molding an article with fabric covering, as shown in sectional view in FIG. 7, coacting members are provided for in injection molding machine, one of the members having a cavity portion associated therewith with a configuration of one side of the article to be molded, while the other of the two members has a detail portion that projects therefrom into the cavity portion of the other member when the two members are brought together along a parting line. The fabric sheet is interposed between the two members along the parting line and may be positioned in registration with the cavity by way of a robotic arm, carrier plate or motorized drive assembly that is able to position the fabric accurately. A substrate layer 20 is then formed behind the backing layer by a low pressure molding process such that the fabric layer becomes the "skin" of the molded article. This is shown in FIG. 7 wherein a fabric cover layer 32 and backing layer 34 containing a pre-weakened tear seam 36 are disposed between an injection mold cavity 50 and core member 60 and back-filled with a plastic to form a substrate 20 filling in any open space between mold cavity 50 and core 60 and urging the cover layer 32 and backing layer 34 to conform to the inner surface 58 of mold cavity 50.

Low pressure molding processes are preferred herein for forming fabric covered trim panels according to the present invention as they typically result in less disruption to the cover layers during manufacture (stretch, wrinkling, compression, overheating, etc.) and are more economical for producing large parts. Low pressure processes that are suitable for this invention generally are of two types, thermoset and thermoplastic. The thermoset low pressure molding processes are generally liquid processes, often called reaction injection molding (RIM) where a reactive polymer or its precursors are injected into a closed mold and flow to fill the open space between mold halves before solidifying. The types of polymers may include, but are not limited to, urethane, polyester, dicyclopentadiene, polyurea, epoxy and acrylic, and may include fillers and reinforcements.

Low pressure thermoplastic molding processes generally entail lower clamp pressure (in the order of 1000 psi) than regular injection molding processes due to one or more of the following characteristics:

filling the mold while it is partially open,
use of cascading sequential gating to distribute the flow,
pre-expanding the melt,
introducing a gas to fill out a short shot,
low speed injection of the polymer,
elimination of pack out and hold pressure,
use of easy flow, low melt viscosity, and high melt index polymers.

Examples of low pressure molding processes include the MuCell process where carbon dioxide or nitrogen is injected in a supercritical fluid state into the injection molding machine barrel to form a single phase solution which when injected into a mold, expands into fine bubbles which fill the mold, and a gas assist process, such as the Gain process, where the injection mold is filled with less plastic than is required to mold a solid part, and a gas under pressure is introduced into the melt which expands to fill out the cavity. Ube Corp.'s Dieprest process injects polymer melt into a partially open tool, then closes the tool (injection-compression) to fill out the cavity. The mold may later be opened to reduce damage to the cover layer. Sumitomo Corp. and Van Dorn Corp. provide a series of cascading sequentially activating valve gates in a hot runner control system that distribute the polymer around the mold, reducing flow distance and providing a more consistent melt velocity. Alternatively, the polymer melt may be extruded across the cavity of the mold using an X, Y, Z robot. Also, near-final-shape preforms may be provided which are placed between the mold halves and require little flow to fill out the open space when the mold is closed.

Figure 6:
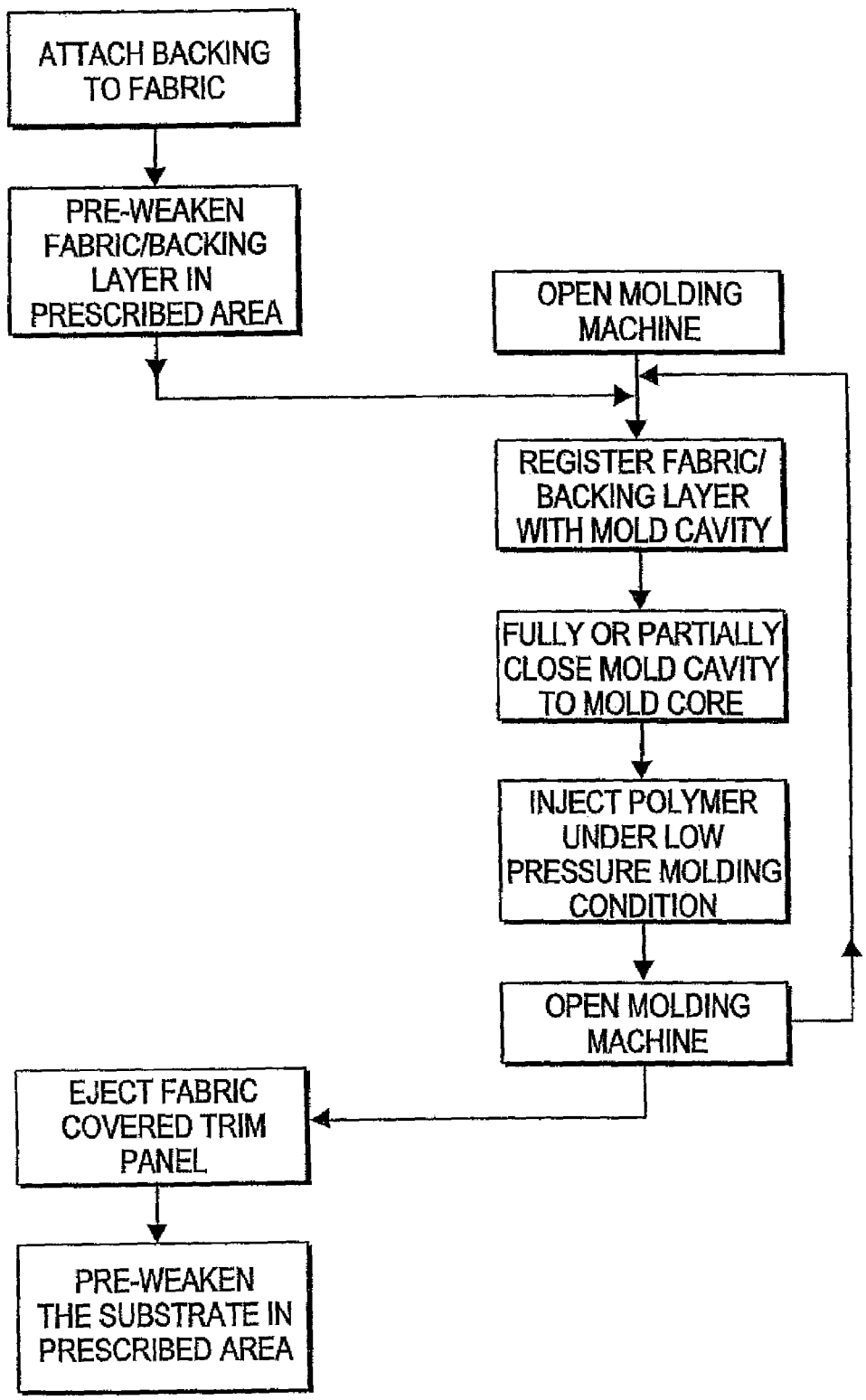
FIG. 6 is a simplified flow chart illustrating the steps of molding a fabric covered trim panel according to the present invention.

As therefore alluded to above, in a preferred embodiment, the cover layers 32, 34 containing a pre-weakened seam 36 are placed between coacting mold halves and a polymer melt injected using cascading, sequentially activated gates distributed across the mold. FIG. 6 briefly describes this process. This process involves the sequential injection of polymer melt into the mold such that the mold is sequentially filled according to each sequential injection of material. Each sequential injection is therefore capable of relatively low injection pressures since it is unnecessary to fill the entirety of the cavity via use of a single gate. In addition the flow distance for fill-out of each section of the mold corresponding to the sequential gates is less than for the entire mold cavity. Accordingly, as used herein, the term sequentially activated gates defines that situation wherein a plurality of gates are employed, connected to the mold cavity, to distribute the molten material throughout the mold cavity. In that context, the gates, while preferentially operating in sequential format, may include some degree of overlap in their filling sequence.

In accordance with the present invention, the preweakening of the fabric and backing present several options. Specifically, one can first preweaken the fabric and place the backing on the fabric, position such fabric/backing in the mold, wherein the backing prevents flow-through during the ensuing step of low pressure molding and substrate formation. This is followed by weakening (laser, cutting, etc) through the substrate and partially into the backing material. Optionally, one can preweaken both the fabric and backing simultaneously, followed by low pressure molding and substrate formation. Specifically, in this later option, it has been recognized that low pressure molding does not exert as much pressure against the preweakened fabric/backing cover layer, in which case the lack of backing at the preweakened sections of the fabric/backing cover layer do not become a significant issue The thermoplastic polymers used to form the substrate of the present invention may include, but are not limited to, polypropylene, polyethylene, polycarbonate, acrylonitrite-butadiene-styrene, polyphenylene oxide, acrylonitrile-styrene-acrylic, styrene maleic anhydride, thermoplastic elastomers, thermoplastic olefins and blends and alloys thereof, optionally including fillers and reinforcements.

Relatively flat trim panels which are used as air bag covers can be formed using the above-described process, as the flow of the polymer melt urges the cover layer into intimate contact with the mold cavity. Deeper panels having more complex shapes may require the preforming of the cover layers 32, 34 prior to backfilling with polymer to form the substrate 20.

This preforming of the cover layers can occur in a separate male or female vacuum forming apparatus or may take place in the cavity of the injection mold using a porous mold and pressure assist.

As can be seen in FIG. 2, once the fabric covered trim panel has been formed in the injection mold, it is removed and the tear seam 26 is formed to demarcate the air bag door 14 from the panel 12. The tear seam 26 in the substrate 20 may be formed by a number of known processes including, but not limited to, laser scoring, sonic knife, heated knife or by forming the seam as part of the injection molding process through the inclusion of sharp mold segments (blades) in the mold core which project through the substrate and are encapsulated by the flow of the polymer around these blades. The tear seam 26 may be a groove, intermittent through-slots or through-holes.

Figure 4:
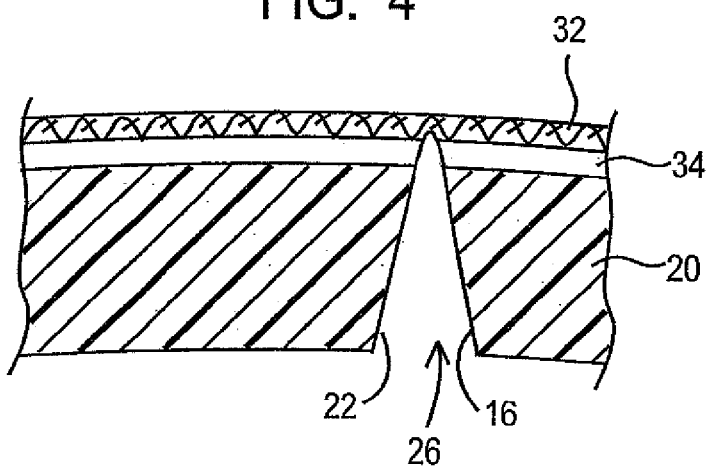
FIG. 4 is a magnified fragmentary cross-sectional view of an air bag cover assembly constructed according to the present invention with an alternate weakening pattern.

FIG. 4 illustrates an alternate pattern of weakening wherein the fabric cover layer 32, the backing layer 34 and the substrate 20 may all be pre-weakened by laser, knife, etc. in a single operation after the trim panel has been molded. In this embodiment, the cover layer 32 and backing layer 34 are not scored, thinned or pre-weakened prior to the low pressure molding process, but rather after the panel has been formed. The pre-weakening may be in the form of a groove, slots or holes that do not extend through the Class A (outer) surface of the trim panel but may extend into any one or all of the cover layers or substrate.

Figure 5:
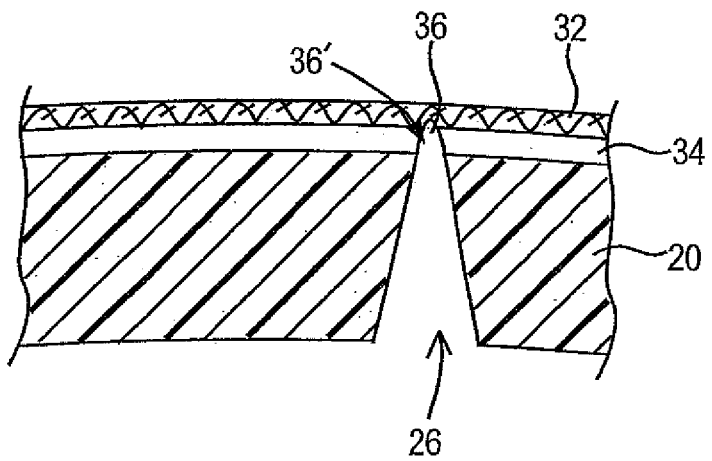
FIG. 5 is a magnified fragmentary cross-sectional view of an air bag cover assembly constructed according to the present invention with an alternate weakening pattern.

As alluded to above, FIG. 5 illustrates another pattern of weakening wherein the fabric cover layer 32 is first pre-weakened to form a tear seam 36' followed by application of the backing layer 34. Subsequently, the cover layer 32/backing layer 34 are formed to the mold cavity by a low pressure injection molding process to form the substrate 20. Upon removal from the mold, the substrate 20 and backing layer 34 are pre-weakened by laser or knife to form tear seam 26, 36 without penetrating the cover layer 32. In this embodiment, pre-weakening of the backing layer may be accomplished by fully penetrating the backing layer, as shown in FIG. 5, or by partial penetration into the backing layer. In addition, by offsetting the location of the tear seams 26 and 36 from 36', strike-through of the molten polymer forming the substrate 20 into the cover layer 32 is minimized.

An alternate construction for a hidden tear seam on a fabric covered trim panel comprises adhering a backing layer 34 to a fabric cover layer 32 and pre-weakening the resultant laminate with a laser or knife from the backside to form a tear seam in a desired location. In this embodiment, the initial pre-weakening would preferably fully penetrate the backing layer 34 and only partially penetrate the fabric cover layer 32. Such pre-weakening seam may be in the form of a groove, slots or holes. The thus pre-weakened laminate may then be pressure or vacuum formed over a plastic substrate formed by low pressure molding and coated with an adhesive. The thusly formed trim panel may be then pre-weakened by laser, knife or other means, from the backside to demarcate an air bag door 14 from the remainder of the panel 12. The pre-weakening or scoring in this embodiment would only penetrate through the substrate layer 20 and may comprise a groove, slots or holes, and may be offset from the pre-weakening in the backing layer and fabric layer.

A still further construction of the present invention for providing fabric covered air bag covers for vehicles employs the use of a pre-weakened cover layer without the use of a substrate. The present invention therefore includes a cover assembly for concealing an air bag restraint system, the assembly comprising a frame defining an air bag opening, a fabric covering attached to the frame in a taut manner, the fabric covering having a single tear seam that is ruptured when the fabric covering is impacted by the inflating air bag, which may preferably form an elliptical opening for deployment of the air bag into the passenger compartment, the tear seam, preferably being cornerless and having ends spaced from the frame. According to this embodiment the fabric covering may also be adhered to a backing layer, either of which is pre-weakened according to the present invention to form a tear seam.

It is further possible with any of the aforementioned examples to provide a backing layer only locally covering the area where the fabric has been weakened to prevent strike through.

Weakening the Fabric Layer from the Front Side

An alternate embodiment of the present invention for providing a fabric covered automotive trim panel for covering an air bag system may include pre-weakening the fabric outer layer from the outer surface or class A side of the panel. The result will be a panel having an interruption or visible evidence of the weakening. U.S. Pat. No. 5,131,678 commonly assigned to the assignee of the present invention and included herein by reference is directed at a decorative panel concealing a storage compartment for an inflatable air bag, comprising a backing plate having a U-shape outline forming the storage compartment and defining a door having a hinge line extending between the ends of the cut line, an inner layer of foam, an outer skin layer forming the outer surface of the panel and having a peripheral groove outlining the door, the groove being characterized by two spaced side walls extending from the outer surface inwardly of said foam and each of said spaced side walls having end portions thereon completely separated by a slit cut therebetween, said spaced sidewalls extending downwardly so as to cause said slit to be located at a point which is not visually observable from the outer surface of the panel to create a tear seam along the weakened section so that inflation of the air bag will force the door to separate said spaced side walls and enable deployment of the air bag outwardly from the panel.

Figure 8:
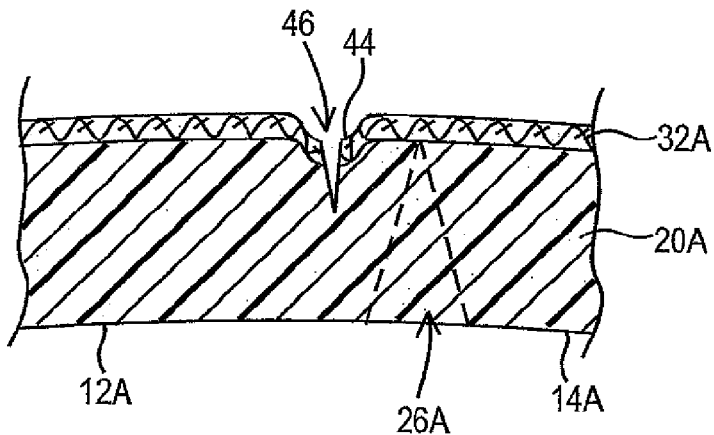
FIG. 8 is a magnified fragmentary cross-sectional view of an air bag cover constructed according to the present invention illustrating an alternate embodiment.

An improvement upon this invention is shown is FIG. 8. In this embodiment, a trim panel has been molded with a fabric outer layer 32A and containing a groove or style line 44 that indicates the approximate location of the edge of the integral air bag door 14A formed in the panel. To pre-weaken the outer layer of fabric 32A and provide predictable tearing of the outer layer, a laser or knife is used to cut through the fabric layer 32A at the bottom of the groove or style line 44. The depth of the groove serves to hide the presence of the tear seam 46 cut into the fabric. The substrate 20A may be scored partially from the front side in the same operation that weakens the fabric layer 32A or the substrate 20A may be scored from the backside using any of the methods as described herein (as noted at 26A by the dashed lines). In this embodiment it may not be necessary to provide a backing layer behind the fabric outer layer 32A as the fabric has not been locally thinned prior to backfilling by low pressure injection, and strike-through will be less likely. A method for forming a tear seam with a knife as described in U.S. Application 60/411,548 which is commonly assigned to the assignee of the present invention may be used and is included herein by reference.

In a related embodiment, the fabric layer 32A may be removed from the door area 14A to provide a design contrast and a visible air bag door. The present invention is therefore directed at a method of manufacturing an instrument panel assembly of an automotive vehicle having an integral air bag deployment door, said method comprising the steps of low pressure molding a retainer of rigid plastic material having a main body portion, an air bag deployment door portion and a molded-in channel extending into the retainer from an outer surface thereof interconnecting the main body and door portion and defining a tear seam line for the door portion, preparing a cover comprising an outer layer of woven or knitted fabric, applying an adhesive to the outer surface of at least the main body portion of the retainer, positioning the woven or knitted fabric over the outer surface of the retainer and drawing a vacuum on the retainer to urge the woven or knitted fabric against the main body and door portion of the retainer and down into the channel, and severing the woven or knitted fabric within the channel.

Figure 9:
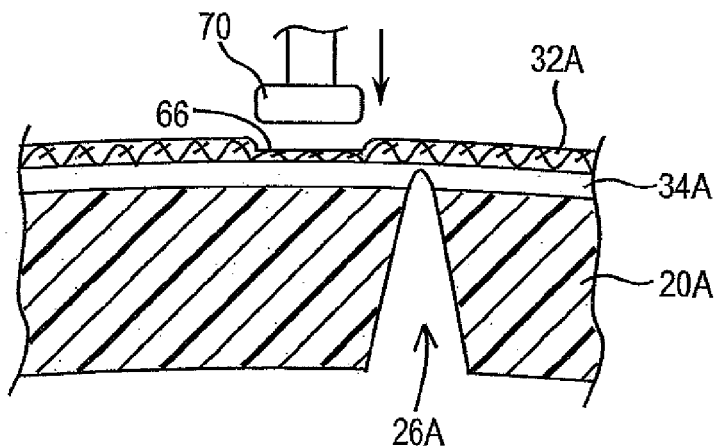
FIG. 9 is a magnified fragmentary cross-sectional view of an air bag cover constructed according to the present invention illustrating with an alternate weakening pattern of the second embodiment.

In an alternate construction of this embodiment, providing a witness line on the front surface of a fabric covered trim panel is accomplished by using a hot die that forms the weakened seam area. FIG. 9 illustrates a fabric outer layer 32A backed by a barrier layer 34A into which a hot die 70 has been pressed in the direction of Arrow B to reduce the thickness of the fabric layer 32A and weaken the fabric by melting and severing some of the fibers. The reduction in thickness 66 may be in a decorative design or pattern, a portion of which essentially coincides with an edge of the air bag door. The barrier layer 34A is present to prevent strike-through during application of the hot die and like the backing layer in previous embodiments, to prevent strike-through of the polymer melt during subsequent backfilling using a low pressure molding process. In this embodiment, weakening of the substrate 20A and backing layer 34A may be accomplished after molding by laser or knife cutting from the back side to form a tear seam 26A adjacent to or in line with the thinned fabric area 66. This weakening may penetrate through the substrate 20A in a groove, slot or hole pattern and may penetrate partially or fully through the backing layer 34A.

Figure 11:
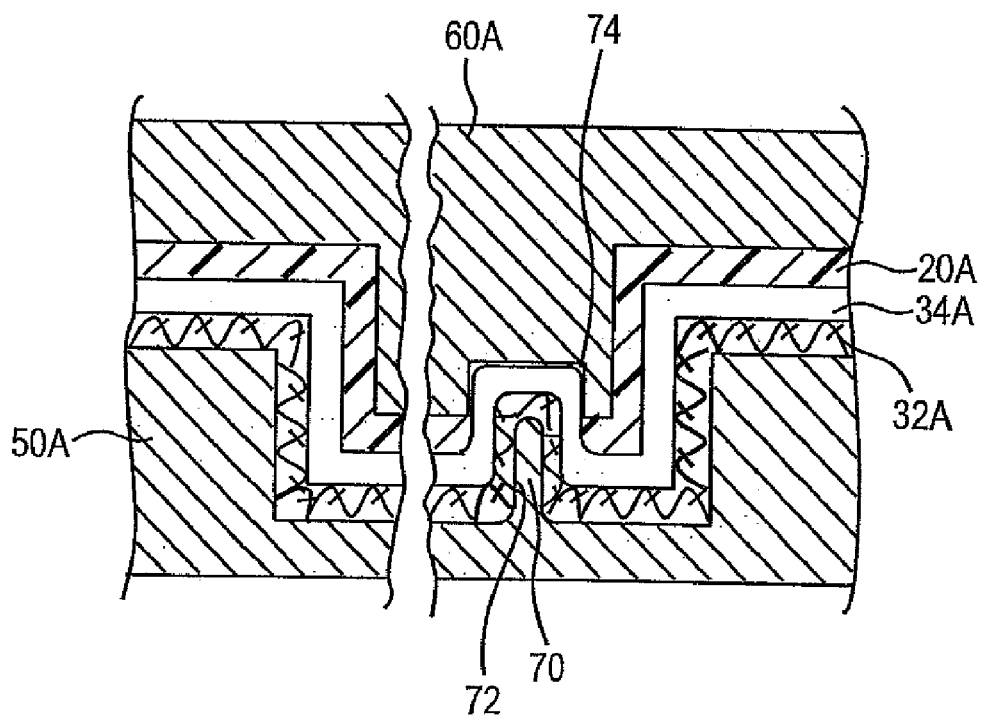
FIG. 11 is a cross-sectional view of the molding apparatus of the trim panel of FIG. 10.
Figure 10:
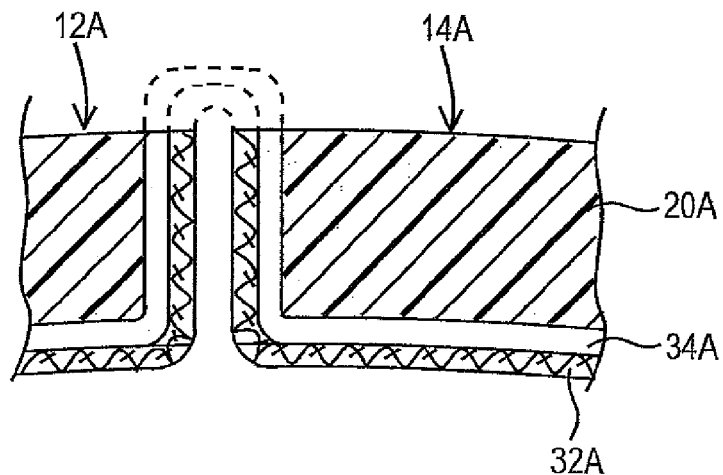
FIG. 10 is a magnified fragmentary cross-sectional view of an air bag cover constructed according to the present invention illustrating an alternate weakening pattern of the second embodiment.

A still further construction for forming a visible tear seam in a fabric covered trim panel utilizes blade-like projections in the injection mold cavity as shown in sectional view in FIG. 11. Here, coacting members of a low pressure injection mold are indicated at 60A for a core member and at 50A for a cavity member. This sectional view of the mold apparatus further illustrates a blade member 70 projecting from a portion of the cavity member 50A, the blade member 70 demarcating at least a portion of an air bag door from a trim panel. A cover sheet comprising a fabric cover layer 32A and a backing layer 34A is preformed to include a groove 72 which matches the blade member 70. The preformed sheet is then placed into the cavity 50A of the injection mold and the groove 72 registered to the blade member 70. The remainder of the open space between the core member 60A and cavity member 50A is filled with polymer using a low pressure molding process to form a substrate 20A. The blade member 70 urges the cover sheet into contact with a depression 74 in the mold core 60A, sealing the substrate 20A from forming therein and extending the formed cover sheet beyond the back surface of the substrate 20A. The resultant trim panel 12A is removed from the injection mold and the portion of the cover sheet extending through the trim panel is cut off to form a weakened area in the area of the air bag door peripheral edge. This is illustrated in FIG. 10 where the cover sheet comprising fabric layer 32A and backing layer 34A and extending through the substrate is indicated by dashed lines as being removed. The blade member 70 would preferably have a stepped or perforated edge such that the cover sheet projects through the substrate layer 20A in an intermittent pattern and leaves the door portion 14A connected to the trim panel portion 12A.

Alternatively, a backing layer 34A may not be required and only a fabric cover layer 32A comprises the cover sheet. Further, the blade member 70 may comprise a series of flat projections or rods that project from the mold cavity 60 surface and register with the preformed cover sheet to form a weakened pattern approximating the door 14A shape. The severing of the cover sheet extending through the substrate may also be accomplished through the use of a laser or knife programmed to cut from the front surface of the panel into the groove 72 and through the cover layer 32A and backing layer 34A.

Weakening the Fabric Internally

Yet another embodiment for pre-weakening a fabric layer to be used as an outer surface layer for an air bag cover for a motor vehicle interior, in addition to thinning, cutting or melting the fabric from either the front (class A surface) or backside, involves the use of weaker fibers in the fabric. This may be accomplished by chemical treatment, by exposure to a radiation (heat or light) source or by weaving or knitting the fabric using weaker fibers in a specific pattern over the air bag door to cause preferential tearing of the fabric upon the air bag deployment. The chemical or radiation weakening embodiments may be carried out on a unformed or formed blank cut to size for use as a trim panel with the weakening applied to a local area in a pattern over the air bag door. All of these fabric weakening embodiments described hereafter may also be carried out on roll goods as part of the manufacturing process for the fabric and may extend fully across the roll to simplify manufacture or encompass the full surface of the door.

In a one construction, the fabric outer layer may be masked off and exposed to a photodegradation process whereby a beam of light is projected on the front or back surface of the fabric in the area which will become the cover layer for the air bag door. Similarly, the treatment may be in a discrete pattern (letter, shape, etc.) or may be accomplished on roll goods as they are being manufactured, preferably with the treatment extending across the width of the roll for manufacturing efficiency. Either the chemical treatment or photo degradation process may also be carried out on roll goods to treat the surface in a discrete pattern much like color printing of the fabric is accomplished. Broadly, this embodiment of the present invention involves treating the air bag cover fabric 32B in the area that is to function as the tear seam, i.e., the tear seam region 16B, from either the front or back surface of the air bag cover fabric 32B sufficiently to locally weaken the material and produce a visibly undetectable tear seam 36B. FIG. 12 illustrates one method of generating the tear seam 36B according to this invention. A UV radiation device, or "UV generator" 48, is arranged over the one surface of the air bag cover fabric 32B and energized to direct UV radiation 40 onto the facing surface of the cover fabric 32B. A UV blocking template 82 is arranged between the UV generator 48 and the cover fabric 32 to block the transmission of the UV radiation 40 to a non-tear seam region 84 of the air bag cover fabric 32B except through prescribed openings 86 in the template 82. The openings 86 correspond in size and shape to the tear seam 36B to be produced, i.e., the tear seam region 16B of the air bag cover fabric 32B. As illustrated, the template openings 86 and tear seam region 16B have a corresponding U-shape, but this is just one pattern of many different patterns that can be employed. Other patterns contemplated include, but are not limited to, "X", "C", "H" and "I"-shaped tear seam patterns that roughly correspond to the outline of the air bag door 14B. The template 82 may comprise a panel made of metal, wood or other material that would serve to block UV radiation transmission to the underlying non-tear seam region 84 of the air bag cover fabric 32B while allowing UV radiation transmission through the template opening 86 to the air bag cover skin tear seam region 16B. The photodegradation of the exposed fabric material 32B can be controlled by controlling the UV exposure time. The time required to achieve a certain degree of material degradation may vary from one fabric to another and may depend on such factors as the type of fabric used for the cover, its thickness, the ambient temperature, the intensity of the UV light, and the irradiance and wavelength of the light. The UV light employed preferably has a wavelength in the approximate range of 10-340 nm to provide optimum energy. It is also preferable that the UV light generator does not emit UV light outside this preferred range. More preferably, the UV generator 48 emits no electromagnetic radiation in the infrared portion of the electromagnetic spectrum in order to minimize or eliminate thermal heat generation associated with infrared radiation. This enables the UV generator 48 to be placed closer to the fabric 32B during treatment to achieve photodegradation without also causing thermal softening and/or cover deformation. FIGS. 13 and 14 illustrate a variation of the UV emitting apparatus of FIG. 12 in which the UV blocking template 82 is attached as a bottom panel of a UV generating unit 48 as opposed to being a separate independent piece as shown in FIG. 12. The remaining features and operation, however, are the same as those described above in connection with FIG. 12. As shown in FIG. 14 the UV generator 48 may be suspended over the fabric as roll goods or as sheet stock 90 after it has been woven or knitted and the radiating of the fabric by the generator may take place on the front or the back side of the sheet. The resultant sheet of fabric with weakened tear seam area may then be backfilled to produce a trim panel. Finally, the substrate layer would be weakened from the backside by laser or knife means in an area that underlies the weakened tear seam 36B. A further alternative includes radiating the fabric with UV radiation over the entire area of the door 14B rather than just in the tear seam region 16B. In addition to controlling the UV generator 48, the cover fabric 32B itself may, through appropriate selection of UV inhibitors and promoters, be formulated to control the susceptibility of the material to photodegradation in the prescribed wave lengths mentioned above. This is achieved by including appropriate UV inhibitors and/or promoters in the polymeric material of the air bag cover fabric 32B.

In another construction, a polyester yarn is woven or knitted into a fabric. The fabric layer 32B is then cut into a blank and a mask applied to the surface of the fabric, either to the front side or back side, the mask covering the surface of the fabric except for an opening in the mask which will outline the cover portion over the air bag door. A sodium hydroxide solution is applied to the unmasked portion of the fabric. The fabric is then preferably heated with steam to activate the sodium hydroxide and finally rinsed with water to remove the sodium hydroxide. The treated area of the polyester fabric has substantially reduced tensile strength compared to the masked area of the fabric such that when the fabric is molded behind and formed into a trim panel containing an air bag door portion, an air bag can burst through the door opening, the door hinged to cause preferential tearing of the weakened fabric in a prescribed pattern adjacent the air bag. The mask may define an area to be treated including, but not limited to, the shape of an "X", "I", "H", "U" or an enclosed shape such as a circle or rectangle. Optionally, a caustic treatment may be applied to fabric roll goods as they are being manufactured, in which case it may be preferred to mask and treat a strip of fabric across the roll rather than a discrete area. When a blank is cut to form a trim panel, care must be taken to align and register the weakened strip with the air bag door formed in the substrate to ensure optimal air bag deployment. A process similar to that shown in FIGS. 12-14 may be used to mask of the fabric from the caustic spray. The UV generator 84 would be replaced with a set of nozzles confined in a chamber to apply the caustic solution through the opening 86 in the template 82 and onto the surface of the fabric.

An additional construction for weakening a fabric cover stock for use as an air bag cover includes the manufacture of fabric wherein fibers or yarn of weaker strength are specifically woven into the fabric in a pattern and in a discrete area to form a weakened area which may comprise the air bag cover layer for a trim panel. In this embodiment, when the fabric is manufactured, preferably woven or knitted, weaker yarns of lesser tensile strength are introduced into the weaving or knitting process at such time that they will form a preferred pattern in an area of the fabric which later will become the air bag door cover. The weaker yarns used would preferably be indistinguishable with the naked eye from the normal yarns such that the weakened area remains invisible until an air bag is deployed through it causing the fabric to tear preferentially. In a weaving process, the use of weaker yarns in a "plaid" or crossing strand pattern which would preferably form a rectangle of weaker fibers in the shape and size of an air bag door would be registered in the injection mold to roughly coincide the air bag door opening in the trim panel. A preferred density of the weaker yarns may be one (1) out of twenty (20) of the yarns of normal strength. The weaker yarns may be formed by a difference in yarn size denier, the use of yarn of a relatively lower average polymeric molecular weight, the use of yarn of a relatively lower degree of orientated polymer, the use of yarn exposed to a heat annealing treatment, and the use of yarn weakened by treatment by a chemical agent, such as caustic, or any combination thereof of all the aforementioned weakening options. In addition, with respect to knitted fibers, a similar means of weakening during manufacture of the fabric is possible, whereby the tricot knit can include weakened fibers included in the longitudinal direction (warp) and weft insertion may be used to include weaker fibers in the direction across the roll.

Figure 15:
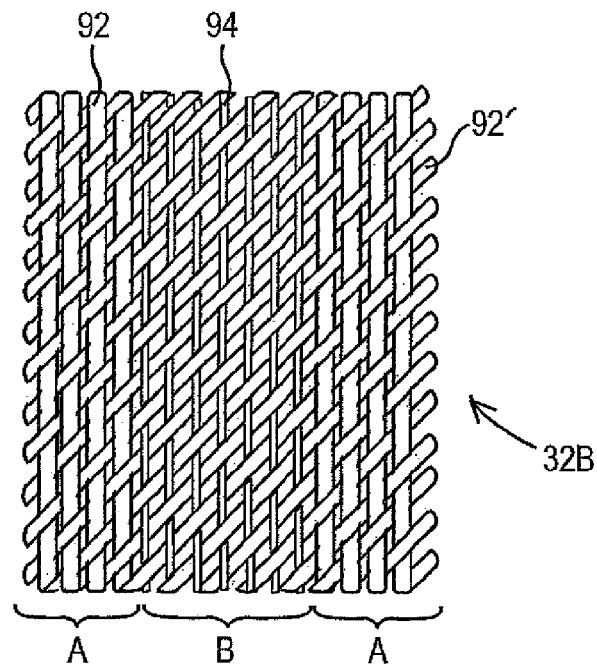
FIGS. 15 and 15A are enlarged diagrammatic views of two different constructions of the third embodiment of the present invention having yarn of different strengths.
Figure 16:
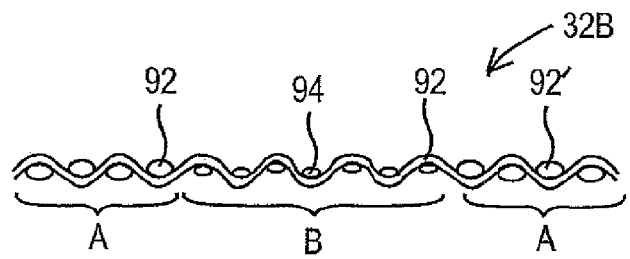
FIG. 16 is a sectional view of FIG. 15.

The construction of the fabric layer in this embodiment of the present invention is shown in simplified diagrammatic form in FIGS. 15 and 16. In FIG. 15, a section of a fabric layer is shown at 32B which comprises yarn woven or knitted in a pattern of interengaging warp and fill (or wales and courses) or warp and weft threads or yarns. The length of the woven fabric 32B is formed of warp threads 92 extending longitudinally in the direction of the length of the woven fabric 32B as well as weft threads 92' extending essentially transversely across the width of the woven fabric 32B. Fibers or yarn of lesser tensile strength 94 are interwoven or knitted in a relatively narrow band (designated as B) in the fabric to provide a strip across and/or along the fabric which will tear more easily than the rest of the fabric (designated as A). The weaker yarn 94 has an appearance indistinguishable from the rest of the yarn 92 and thus may be woven below the top surface of the fabric or alternately near the top surface of the fabric. FIG. 16 shows a sectional view of the woven or knitted fabric. While the weaker yarn is shown as smaller in diameter in the FIGS., this would not need to be the case in actuality as the weaker yarn may be weakened by chemical, radiation or composition means and not need to be of less diameter.

Figure 15A:
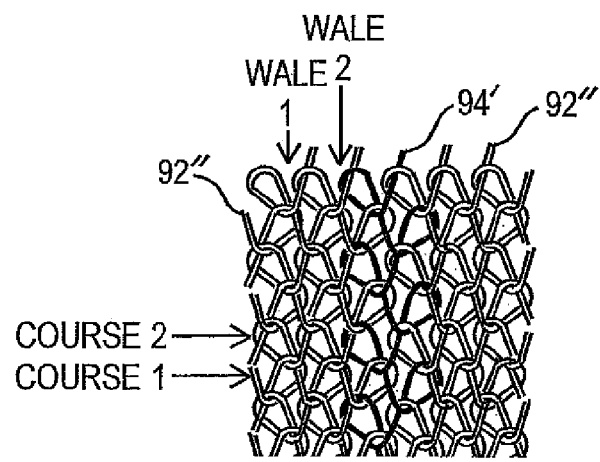
Figure 17:
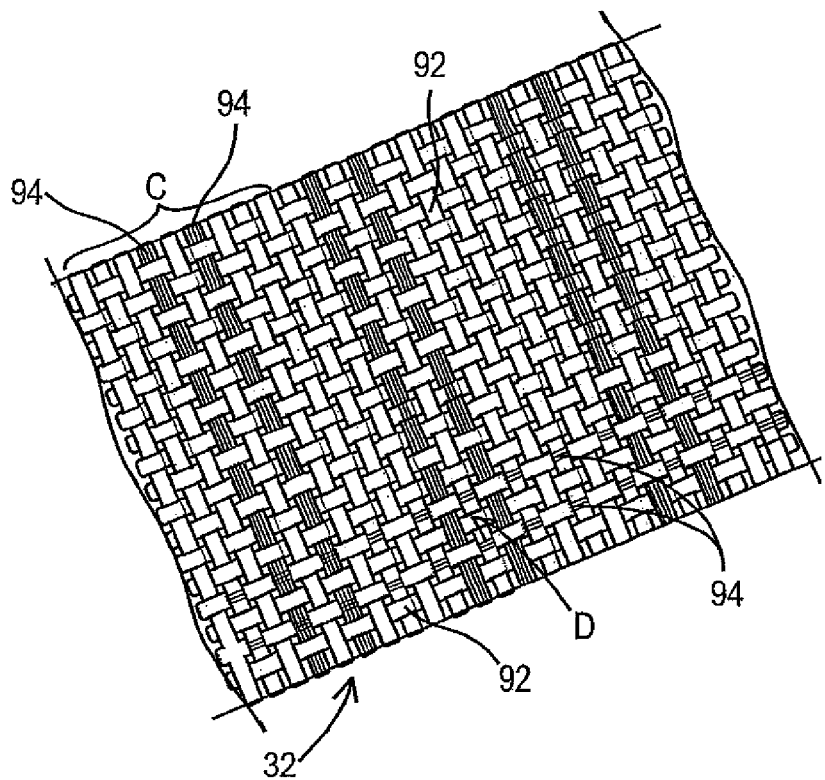
FIG. 17 is a diagrammatic view of one pattern of weaker yarns included in a fabric layer.
Figure 18:
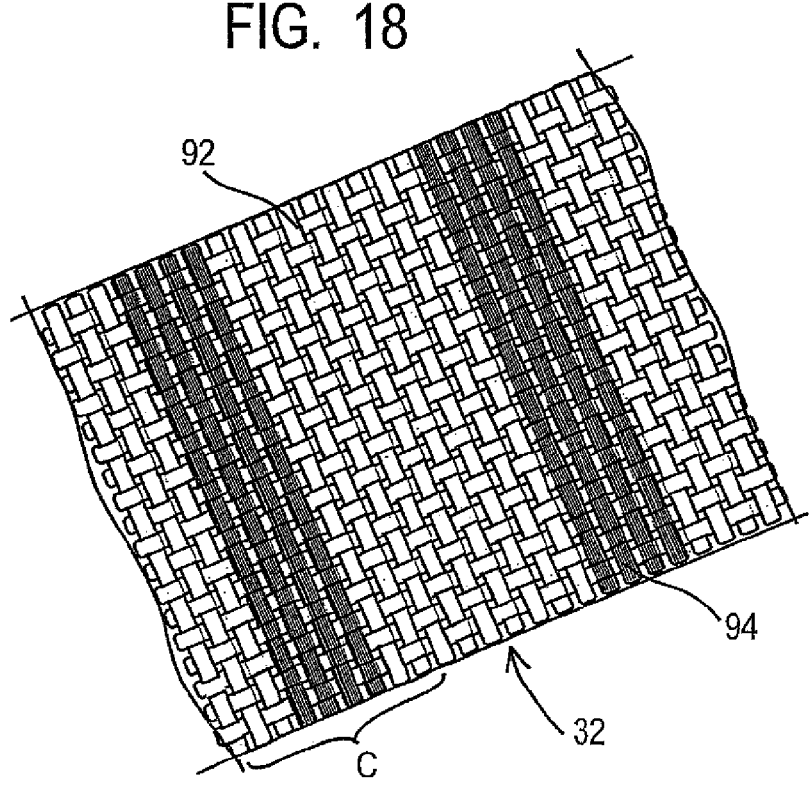
FIG. 18 is a diagrammatic view of an alternate pattern of weaker yarn included in a fabric layer.

FIG. 15A diagrammatically illustrates a similar construction for a knitted fabric with a weaker yarn indicated at 94' and the standard yarn at 92". FIGS. 17-20 illustrate two of many possible configurations of weakened fabric patterns that may be used to provide a weakened fabric layer for use over an air bag system. In FIG. 17, the weaker yarns 94 are provided in a rectangular pattern of weakening as the yarn is woven or knitted in both a longitudinal and lateral direction. When the fabric is cut into blanks or sheets, indicated at C for forming the air bag cover, the area indicated at D would be registered to the mold cavity such that when backfilled with polymer it would overlie the air bag door portion molded into the trim panel. Alternatively, as shown in FIG. 18, the weakened yarn 94 may be woven into the fabric 32B in a band that extends across or along the web of fabric and provides an area of weakening that extends across the entire trim panel. The band of weakness 94 may only cover the rear-most edge of the air bag door, nearest the occupants of the vehicle, or may extend the full depth, front to rear, of the door outermost surface. Conversely, the yarns 94 (either knitted or woven) in FIG. 17 may be significantly stronger than the surrounding yarn 92 such that upon air bag deployment the air bag door area severs at the surrounding stronger yarn 94 to preferentially tear open.

It is further possible to weave or knit a fabric having a discrete pattern woven into the area designated to overlie the air bag door to form a weakened area in the shape of the door ("U", "I", "H", "X") such as a plaid or embroidered cloth is manufactured with the weaker yarns comprising a higher percentage of the fabric in the area which will become the air bag door cover. Blanks may then be cut from the fabric roll goods to form sheets which may be delivered to an injection mold in a preformed or unformed state and registered to the mold surface such that the pre-weakened area is located in the area of the air bag door portion of the trim panel. Once backfilling of the panel is completed, the substrate may be further weakened from the backside by laser or knife cutting to demarcate the air bag door from the trim panel portion.

Yet another means of weakening a fabric an/or leather, polymeric films and other rolled goods material that can be used as a cover for an air bag assembly, as disclosed herein, includes the use of a laser applied to roll goods as they are being manufactured to weaken discrete areas of the fabric which will overlay an air bag door. Current uses of lasers in the fabric industry include cutting of fabric, engraving designs on carpets, fixing dyes or heat treating unbleached or bleached goods so as to impart improved adhesion properties, and scribing graphics on to the face of a material for aesthetic reasons. The concept of applying a laser to the back of a fabric material for the controlled alteration of physical properties, specifically to pre-weaken the fabric, leather, polymeric films and other rolled goods, for use as a trim cover for an air bag door, is provided herein. Types of properties affected by the laser include, but are not limited to, tensile strength, tear strength, elongation, recovery, gas or liquid permeability, sound absorbing and pliability. It has been found that with proper selection of laser operating parameters, such as speed, power level, frequency, wavelength, etc., that the strength of a woven or knitted fabric, leather, polymeric film, etc., may be reduced locally. It is also important to note that such strength reduction can be achieved without altering the surface aesthetics. Or, stated another way, the strength reduction is not the result of cutting or engraving, and substantially avoids such physical alteration of the fabric, leather or polymeric film material.

Expanding upon the above, this technique provides a means through programming of a robot which directs the laser to provide a weakened pattern for a fabric, leather or polymer film layer to be used as a cover over an air bag. According to the present invention, e.g., a laser is directed onto the backside of a fabric outer layer which is to be used as the cover for an air bag system. The laser energy density per unit time (see, e.g., U.S. Pat. No. 6,252,196B1) can be altered to vary the impact on material properties. The laser is driven by a robot to project the laser beam onto the back surface of the fabric and focus the laser energy in a pattern in the fabric which closely resembles the shape of the outline of the air bag door which the fabric will overlay. Upon activation of the laser, the area of the fabric encountering the laser beam is significantly weakened without any appreciable change in aesthetics. Stated another way, no physical cut, e.g., is applied to the fabric, leather, or polymeric film, but the fabric, leather and/or polymeric film is nonetheless strategically weakened by the laser exposure.

Figure 19:
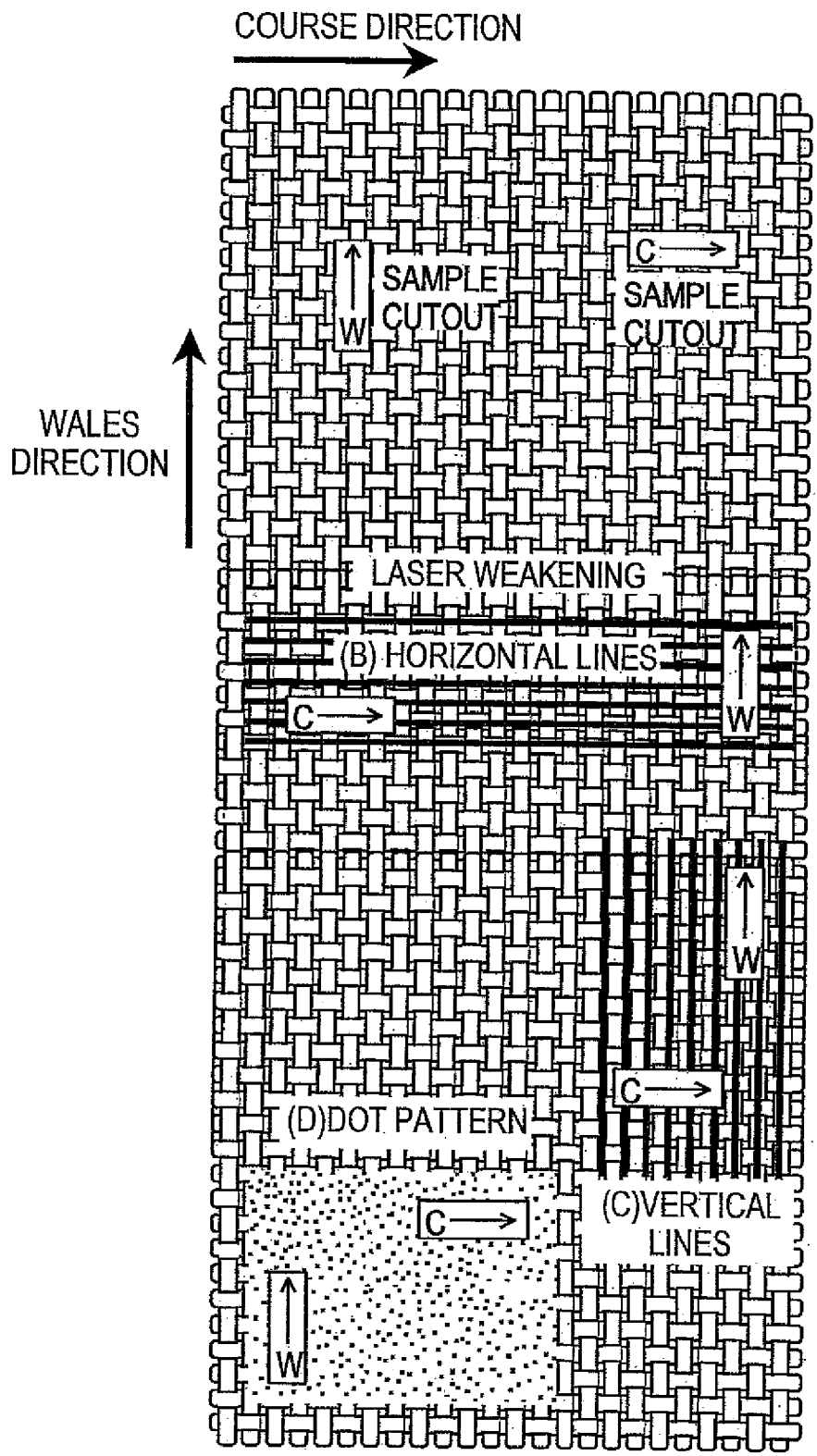
FIG. 19 is a schematic illustrating the orientation of the tensile and elongation samples cut from the laser treated fabric according to the present invention.

Table I and II describe the effect of laser treatment on the back of a polyester knitted fabric using different laser parameters. FIG. 19 is a schematic view of a polyester knit tricot fabric layer of about 315 grams/square meter, which has been treated with a $CO_2$ laser using three different weakening patterns, a "dot" pattern (a), a "horizontal line" pattern (b) in the course direction of the fabric and a "vertical line" pattern (c) in the wales direction of the fabric. The laser was projected onto the fabric layer at two different power levels. Samples for tensile and elongation testing were cut in the both wales and course directions from all three areas weakened by treatment with the laser as shown in FIG. 19, and compared to the tensile and elongation samples of untreated fabric. The difference between the "dot" pattern (a) and the "line" patterns, (b) and (c), is the duration of time and the pulse rate of the laser as it is moved relative to the fabric.

TABLE I

Tensile Strength of Fabric

|  | Dot Pattern<br>Wales Direction | Dot Pattern<br>Course Direction |
| --- | --- | --- |
| Original | 350N | 850N |
| Power Level 50 | 210N | 480N |
| Power Level 60 | 135N | 340N |
|  | Horizontal Line<br>Wales Direction | Horizontal Line<br>Course Direction |
| Original | 290N | 730N |
| Power Level 45 | 220N | 420N |
| Power Level 55 | 220N | 265N |
|  | Vertical Lines<br>Wales Direction | Vertical Lines<br>Course Direction |
| Original | 300N | 730N |
| Power Level 45 | 140N | 520N |
| Power Level 55 | 100N | 435N |

TABLE II

Elongation of Fabric

|  | Dot Pattern Wales Direction | Dot Pattern Course Direction |
|---|---|---|
| Original | 75% | 135% |
| Power Level 50 | 86% | 70% |
| Power Level 60 | 51% | 65% |

|  | Horizontal Line Wales Direction | Horizontal Line Course Direction |
|---|---|---|
| Original | 70% | 105% |
| Power Level 45 | 65% | 70% |
| Power Level 55 | 64% | 56% |

|  | Vertical Lines Wales Direction | Vertical Lines Course Direction |
|---|---|---|
| Original | 69% | 105% |
| Power Level 45 | 44% | 82% |
| Power Level 55 | 38% | 77% |

Figure 20:
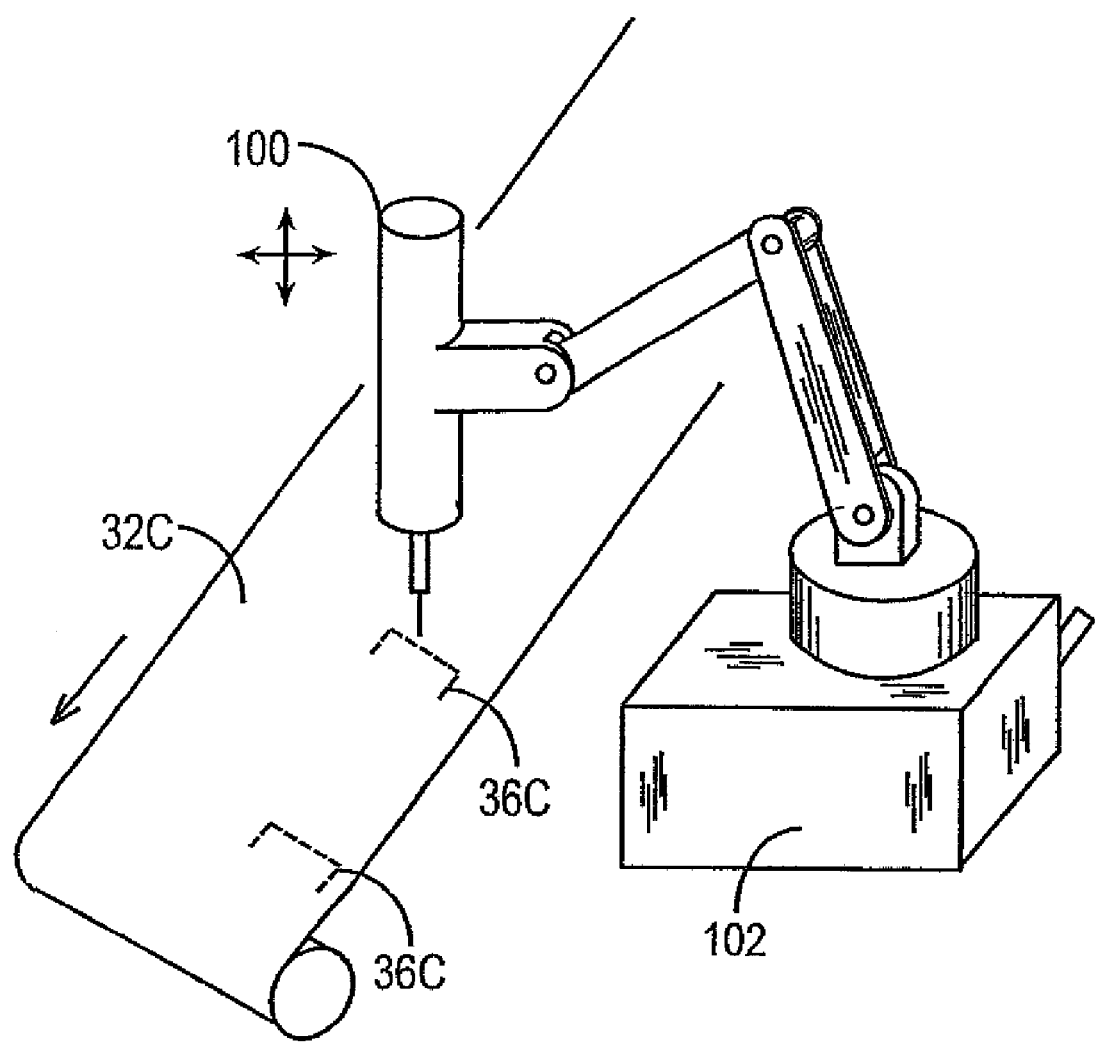
FIG. 20 is a diagrammatic view of a laser used to weaken a fabric layer according to the present invention.

FIG. 20 is a diagrammatic view of a laser 100 driven by a robot 102 being projected onto the backside of a fabric layer 32C to provide weakening in a discrete pattern 36C to be formed over an air bag door portion of a trim panel to weaken the fabric in a pattern resembling the outer periphery of the door and insure predictable tearing of the fabric layer and deployment of the air bag. Laser treatment of a fabric layer to weaken the fabric in a discrete pattern to essentially match the outline of an air bag door may also be carried out on the front surface of the fabric layer, or alternatively on the front surface of a formed trim panel. The result is a preferentially weakened cover layer having a pattern or design on the outer surface which indicates the presence of the tear seam. The tear seam may be integrated into a decorative or artistic design.

Figure 21:
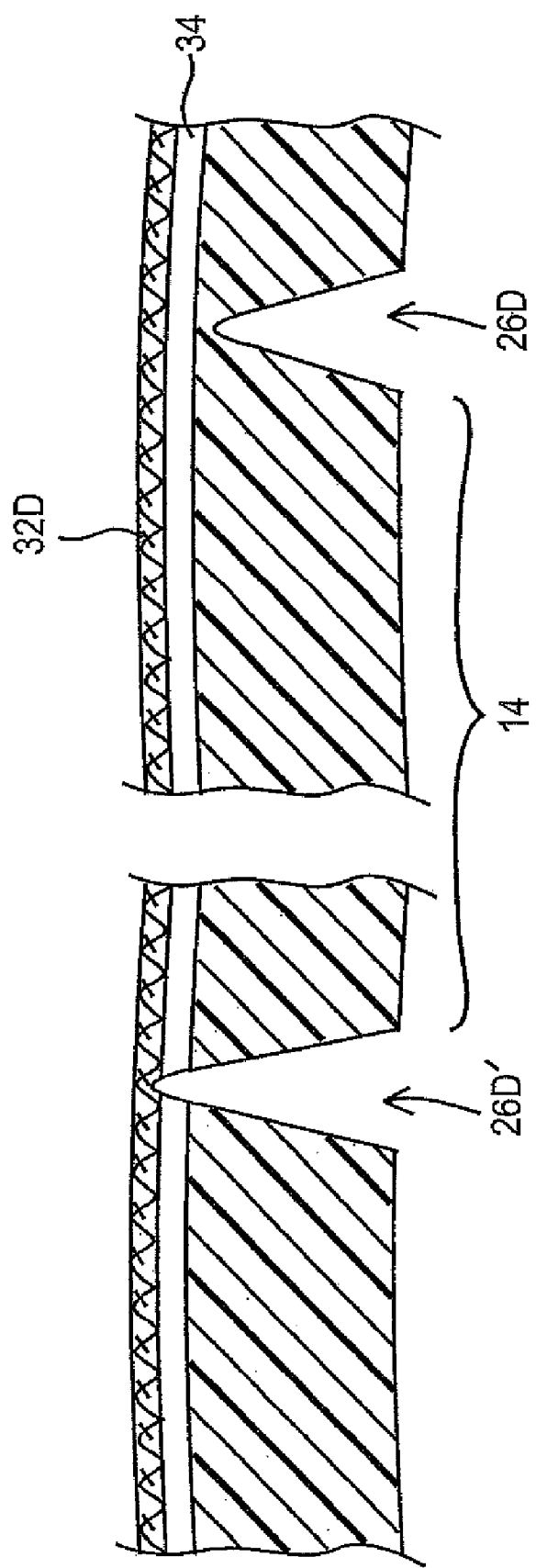
FIG. 21 is a magnified fragmentary cross-sectional view, similar to FIG. 2 of an alternative air bag cover assembly constructed according to the present invention.

Referring to FIG. 21, there is illustrated another exemplary embodiment of a fabric covered instrument panel assembly with an integral air bag door, as previously described. This is an enlarged cross-sectional view similar to FIG. 2. The instrument panel assembly may generally include a fabric outer layer 32D that is disposed over a backing layer 34D, which is, in turn, disposed over a substrate 20D. An air bag door 14 is defined in the substrate 20D by a line of mechanical weakness circumscribing the perimeter of the air bag door 14. According to the exemplary embodiment, the line of mechanical weakness defining the air bag door 14 includes tear seams, generally indicated at 26D and 26D'.

The aspect of the invention illustrated in FIG. 21 differs from the previously described embodiments in that the tear seam 26D corresponding to the hinge region of the air bag door 14 does not include pre-weakening of the fabric layer 32D. Preferably, the tear seam 26D' circumscribing the remainder of the air bag door 14 includes pre-weakening of the fabric layer 32D. According to the illustrated embodiment, pre-weakening of the fabric layer 32D along the tear seam 26D' may include local thinning of the fabric layer 32D. Consistent with this configuration, during air bag deployment, the tear seam 26D, 26D' fails allowing the air bag door 14 to open in a predictable manner. Along tear seam 26D', failure of the tear seam includes rupture of the fabric layer 32D along the tear seam 26D', therein allowing the air bag door 14 to open. However, because the fabric layer 32D is not pre-weakened along the region of the tear seam 26D corresponding to the hinge of the air bag door 14 desirably remains intact.

Consistent with this aspect of the invention, the fabric layer 32D may serve as an air bag tether system for a fabric covered instrument panel assembly because the fabric layer 32D remains intact in the region of the air bag door hinge. Therefore, when the air bag deploys the fabric layer 32D acts as a large tether for the door and keeps the door in place. Accordingly, the need for a separate tether system, such as that indicated by 41 in FIG. 2, may be eliminated.

In order to ensure that the air bag door will be retained by the fabric layer 32D, it may be desirable selectively reinforce the fabric layer 32D in the region of the tear seam 26D in the region of the air bag door hinge. Such selective reinforcement may be provided by programming the fabric layer 32D with high strength fibers in the region of the tear seam 26D, i.e., provide high strength fibers in the weave or knit of the fabric layer 32D. By high strength fibers it is meant any fiber that has a higher tensile strength than the nominal fabric layer fiber or yarn. This is generally the converse of the weakening method disclosed with reference to FIGS. 15 and 16. That is, rather than introducing fibers or yarns that are weaker than the nominal fibers or yarns of the fabric, the fabric 32D may be reinforced by locally introducing fibers or yarns that are stronger than the nominal fibers or yarns of the fabric.

As alluded to above, the fabric cover stock may be selectively strengthened by incorporating fibers or yarn of greater strength into the fabric in a pattern and in a discrete area to form the strengthened area in the region of the air bag door hinge. In this embodiment, when the fabric is manufactured, preferably woven or knitted, stronger yarns of greater tensile strength are introduced into the weaving or knitting process at such time that they will form a preferred pattern in an area of the fabric which later will become the hinge region of the air bag door. The stronger yarns used would preferably be indistinguishable with the naked eye from the normal yarns such that the strengthened area remains invisible until an air bag is deployed, wherein the stronger yarns do not rupture. In a weaving process, the use of stronger yarns in a "plaid" or crossing strand pattern which would preferably form a rectangle of stronger fibers that extend across the hinge region of the air bag door would be registered in the injection mold to roughly coincide the air bag door hinge region in the trim panel. A preferred density of the stronger yarns is selected such that the yarn functions as a tether. The stronger yarns may be formed by a difference in yarn size denier, the use of a yarn of a relatively higher average polymeric molecular weight, the use of yarn of a relatively higher degree of orientated polymer, the use of yarn of high tensile strength polymeric material, such as Kevlar. In addition, with respect to knitted fibers, a similar means of strengthening during manufacture of the fabric is possible, whereby the tricot knit can include strengthened fibers included in the longitudinal direction (warp) and weft insertion may be used to include stronger fibers in the direction across selected areas of the roll.

Figure 22:
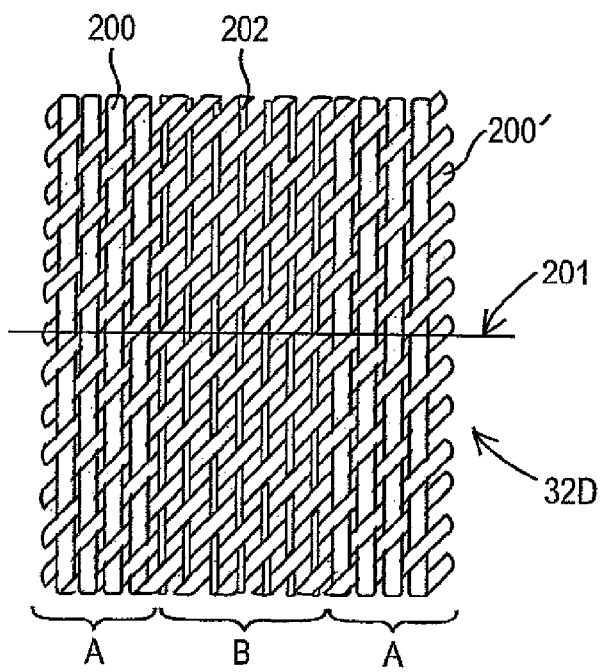
FIG. 22 is an enlarged diagrammatic view of a construction an exemplary woven fabric layer consistent with the present invention having yarn of different strengths.
Figure 23:
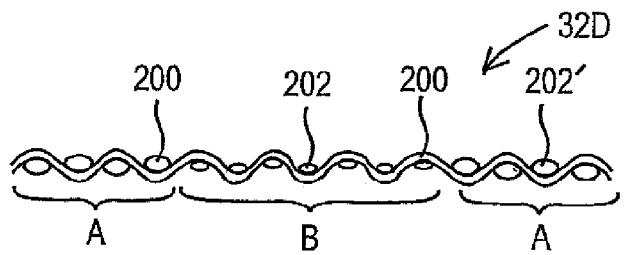
FIG. 23 is a sectional view of the fabric construction of FIG. 22.
Figure 24:
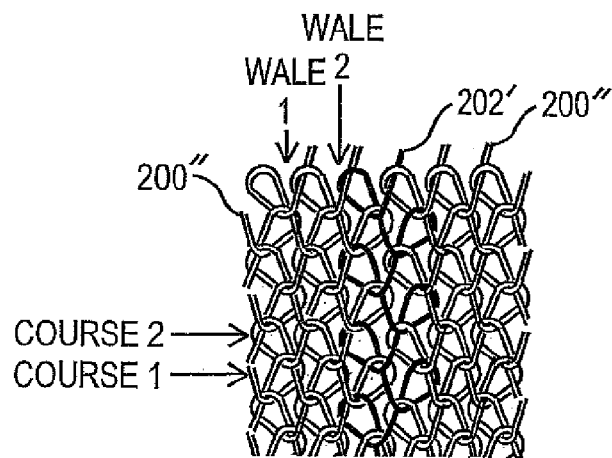
FIG. 24 an enlarged diagrammatic view of a construction an exemplary knitted fabric layer consistent with the present invention having yarn of different strengths In the appended drawings, common elements use the same numeric characters but are distinguished by the addition of a letter to identify a common element between embodiments (for instance, 10 10A, 10B, etc.).

Referring to FIGS. 22 through 24, simplified diagrammatic illustrations of this mode of providing selective reinforcement of the fabric layer are shown. In FIGS. 22 through 24 a section of fabric layer 32D is shown including yarn woven or knitted in a pattern of warp and fill (or wales and courses) or warp and weft threads or yarns. The length of the woven fabric 32D is formed of warp threads 200 extending longitudinally in the direction of the length of the woven fabric 32D, as well as weft threads 200' extending essentially transversely across the width of the woven fabric 32D. Fibers or yarns of greater tensile strength 202 are interwoven or knitted in a band (designated B) that is arranged such that it will span the hinge region of the air bag door. Preferably the stronger fibers 202 have an appearance that is indistinguishable from the rest of the yarn 200, and thus may be woven below the top surface of the fabric or alternatively near the top surface of the fabric. FIG. 23 shows a sectional view of the woven or knitted fabric. In addition, the hinge is preferably positioned such that the hinge line 201 is perpendicular to the fibers 202 of greater tensile strength. However, while a hinge line at such 90 degree angle to the fibers 202 is preferred, it can be appreciated that the hinge line can vary an intersect with the fibers 202 at angles greater than 90 degrees, up to 179 degrees, and at all 1 degree increments therebetween, which therefore still provides at least a portion of the fibers span the hinge line and exert a strengthening effect.

Referring to FIG. 24, a similar construction for a knitted fabric is shown including a stronger reinforcing yarn 202' and a weaker yarn 200" making up the majority of the fabric. As shown, the stronger yarn 202' forms a band (or several bands) within the knitted fabric. The size of the bands will, of course, depend upon the degree of reinforcement necessary.

According to this aspect of the invention, further embodiments may include tear seams 26D, 26D' provided by pre-weakening of the instrument panel assembly in general, and the fabric outer layer 32D in particular, according to any of the methodologies or mechanisms described hereinabove. Such pre-weakening may include weakening of the fabric layer from the front side of the instrument panel, weakening the fabric layer from the back side of the instrument panel, or weakening the fabric layer internally. Methods of pre-weakening the fabric layer 32D along the tear seam 26D', and corresponding structures, have been thoroughly described above.

The specific features of any single embodiment discussed herein and shown in all the appending FIGS. are applicable and interchangeable to any and all of the embodiments shown herein.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. An air bag cover for an air bag safety system for a vehicle comprising:
   a fabric outer layer having a front side and a backside,
   a substrate containing an opening, said opening closed by an airbag door, said door having a periphery at least a portion of which comprises a door/substrate tear seam and a hinge region, the substrate formed by low pressure molding at a clamp pressure of less than or equal to about 1000 psi.,
   wherein the fabric outer layer overlies the opening in the substrate, and wherein the fabric outer layer is weakened by partially cutting into the backside of said fabric outer layer at a location a portion of which is located outboard of said door/substrate tear seam, and
   wherein said fabric outer layer is selectively strengthened by incorporating fibers or yarn of greater strength in a pattern and in a discrete area to form the strengthened area in the region of the air bag door hinge region to provide a tether for said airbag door.

2. The air bag cover of claim 1, wherein said door is formed integrally with said substrate, said door having an outer edge.

3. The air bag cover of claim 1, wherein the fabric outer layer includes a backing layer positioned between said fabric outer layer and said substrate.

4. The air bag cover of claim 3 wherein said weakening of said fabric outer layer including said backing layer is provided by cutting with a laser or knife.

5. The air bag cover of claim 3, wherein at least one of said fabric outer layer, said backing layer or said substrate are weakened by the application of a knife or a laser and at least partially cutting through any one of said fabric outer layer, said backing layer or said substrate.

6. The air bag cover of claim 1 wherein the fabric outer layer is weakened in a pattern that lies just outside of the opening in the substrate that is closed by the door.

7. The air bag cover of claim 1 wherein said low pressure molding comprises one of sequential injection molding, reaction injection molding, injection-compression molding, gas assist injection molding, structural foam molding, gas counter-pressure injection molding, and extrusion molding.

* * * * *